(12) United States Patent
Shi et al.

(10) Patent No.: US 7,032,003 B1
(45) Date of Patent: Apr. 18, 2006

(54) HYBRID REPLICATION SCHEME WITH DATA AND ACTIONS FOR WIRELESS DEVICES

(75) Inventors: Shepherd S. B. Shi, Austin, TX (US); Debora B. Rinkevich, Austin, TX (US); William M. Droste, Round Rock, TX (US)

(73) Assignee: Union Gold Holdings, Ltd., New Providence (BS)

( * ) Notice: Subject to any disclaimer, the term of this patent is extended or adjusted under 35 U.S.C. 154(b) by 750 days.

(21) Appl. No.: 09/928,925

(22) Filed: Aug. 13, 2001

(51) Int. Cl.
*G06F 15/16* (2006.01)
(52) U.S. Cl. ............... 709/203; 709/211; 709/232; 707/10; 707/204
(58) Field of Classification Search .......... 707/201, 707/1, 10, 202, 204, 232, 203; 709/211
See application file for complete search history.

(56) References Cited

U.S. PATENT DOCUMENTS

| | | | |
|---|---|---|---|
| 5,687,363 A * | 11/1997 | Oulid-Aissa et al. | 707/4 |
| 5,884,323 A * | 3/1999 | Hawkins et al. | 707/201 |
| 6,643,669 B1 * | 11/2003 | Novak et al. | 707/201 |
| 6,757,696 B1 * | 6/2004 | Multer et al. | 707/201 |
| 6,810,405 B1 * | 10/2004 | LaRue et al. | 707/201 |
| 2002/0042774 A1 * | 4/2002 | Ortiz et al. | 705/39 |
| 2002/0059256 A1 * | 5/2002 | Halim et al. | 707/10 |
| 2003/0069874 A1 * | 4/2003 | Hertzog et al. | 707/1 |

\* cited by examiner

*Primary Examiner*—Rupal Dharia
*Assistant Examiner*—Djenane Bayard
(74) *Attorney, Agent, or Firm*—Wei Te Chung

(57) ABSTRACT

A method is provided to synchronize a local data storage on a wireless computing device with a remote data storage located on a server based upon user defined business logic stored on the server and corresponding to a particular data object. The method employs a synchronization message that includes a data object to be updated, a corresponding action that has been performed on the data object and an old data object corresponding to the data object prior to when the action was performed. The user can define, by means of the business logic, validation, processing and conflict resolution functionality specific to a particular type of data object. The method includes provisions for both on-line and off-line synchronization.

19 Claims, 12 Drawing Sheets

HYBRID REPLICATION SCHEME WITH DATA AND ACTIONS FOR WIRELESS DEVICES

CROSS REFERENCE TO RELATED APPLICATIONS

The following related patent applications, all of which have at least one common inventor and are commonly assigned, are hereby incorporated by reference as if set forth in their entirety:

U.S. patent application Ser. No. 09/928,646, entitled "PERSONALIZED DATA REPLICATION FOR WIRELESS DEVICES USING FILTERS," filed concurrently;

U.S. patent application Ser. No. 09/928,650, entitled "PROACTIVE DATA REPLICATION FOR WIRELESS DEVICES," filed concurrently; and U.S. patent application Ser. No. 09/928,964, entitled "LOCATION BASED DATA REPLICATION FOR WIRELESS DEVICES," filed concurrently.

BACKGROUND OF THE INVENTION

1. Technical Field

The invention relates to a method of synchronizing a local data storage on a wireless computing device with a remote data storage on a remote server by transmitting both data objects and actions that have occurred to those data objects.

2. Description of the Related Art

Soon after computers were invented, people began connecting them together. Connections among multiple computers enabled scarce resources such as printers and memory devices to be shared. At first, connections between computers were established with wires, but, as technology advanced and a need developed for more flexibility, wireless communication methods were created and deployed. Early wireless communication techniques involved periodically connecting a mobile device to a network access point via a cable or via infrared signals between the mobile device and the network access point. These techniques require either attaching wires to the mobile device or placing an infrared port on the mobile device within the limited range of a corresponding infrared port at the network access point. Basically, early wireless communication techniques enabled mobile devices to communicate with each other or other computers only within a limited physical range. The issue of limited range was addressed in the nineties when computing devices were designed to take advantage of new wireless communication networks, e.g., cellular telephone systems, that were beginning to appear around the United States and the world.

By the late nineties, wireless networks spanned much of the world, allowing mobile computing devices to communicate from almost any location with each other and with remote computers hosting centralized data storage applications, or "data servers." For example, using these communication networks, sales people, using wireless-modem equipped, laptop computers, can keep in touch with their company's centralized inventory and ordering systems. In addition, mobile devices such as personal digital assistants (PDAs) and sophisticated cellular telephones enable users to access the Internet, a world-wide collection of computers that collectively store vast resources of data. Some mobile devices are also able to access the public telephone network (PTN) and/or the Internet to communicate with each other. Using current mobile computing devices, users are able to connect to mail servers, web servers, on-line banking and other server-based, or "backend," applications located on remote data servers. Many companies, sensing a potential advantage afforded by providing access from mobile devices to their systems or servers, seek to extend their business into the wireless world by offering workers and customers remote access to both user interfaces and backend systems, thus providing users the ability to perform transactions through their mobile devices.

Of course, the new wireless technologies have their share of problems. For example, the small size of many mobile computing devices only provides enough room for small input and output areas and a small memory for data and applications. These problems mean that data entry on a mobile device can be difficult and the applications that run on the mobile device must be small. Other problems include the high cost of maintaining a wireless connection and the problems associated with ensuring consistent, accurate and current data on a mobile device.

A current solution to the problem of a limited area for input and output involves the use of handwriting recognition software. However, handwriting recognition software is typically quite large and thus the mobile device runs into the memory problem. Another solution is to provide a small keyboard. However, such keyboards are typically difficult to use. Another solution involves the use of screen icons, each of which represents a desired action, and a stylus, which is used to touch a particular icon on the display of the mobile device. When the stylus touches a particular icon, the action associated with the icon is initiated. Many PDAs have adopted this icon/stylus approach because it seems to offer the best balance between ease of input and the need to fit the applications that control input into a small memory.

As mentioned above, most mobile devices have limited memory. The memory capacity of a mobile device not only creates a need for small applications to run on the mobile device but also limits the size of any data storage employed in conjunction with such an application. One answer to this problem relating to data storage is to place the database upon a second computer such as a data server and periodically connect the two computers for synchronization.

Of course, if one particular data source, such as a product database, stored on a remote computer, is shared among multiple users, issues relating to data consistency, or "data synchronization," arise. Data synchronization is the process ensuring the data in one database is identical to the corresponding data in another database so that any user of the data is aware of any changes made to the data by other users. For example, if a company has one baseball in stock and a first sales person sells that baseball, a second sales person needs to be aware that the company no longer has a baseball to sell. In order for the second sales person to know of the inventory update, at least two things must happen: (1) the first sales person must update the server to reflect the new number of baseballs; and (2) the data used by the second sales person, if local to the sales person's mobile device, must be updated to reflect the updated information on the server.

Another issue related to database access that has implications for synchronization is that mobile access can often be location dependent or intermittent. A user may not have access to a network connection, or an established connection can be lost unexpectedly in the middle of a transaction. In addition, the cost of a wireless connection is typically higher than a wired connection and, if a user needs to be constantly connected, the cost associated with maintaining the connection can potentially exceed the additional profits generated by the wireless business solution.

SUMMARY OF THE INVENTION

A method is provided to synchronize a local data storage on a computing device that employs wireless communication techniques, or a "wireless computing device," such as a personal digital assistant (PDA), a wearable computer, a web-enabled telephone or a laptop computer with a remote data storage located on a server. If the remote data storage provides data to or stores data for multiple computing devices, data conflict issues can arise. The method of the disclosed embodiment addresses data conflict issues by means of business logic that executes on the server. The business logic is defined by a user of the wireless computing device and is specifically tailored to a particular type of data objects, or a "domain." In other words, each of multiple domains may have its own business logic.

The data synchronization technique employs synchronization messages that include a data object to be updated and a corresponding action that has been performed on the data object. In addition to the data object and the corresponding action, the synchronization message includes an old data object corresponding to the data object prior to when the action was performed. Using the old data object, the server can verify that the local data storage and the remote data storage were synchronized prior to the action.

Actions such as read and update are performed to the data on the wireless computing device, which can be in either an on-line mode or an off-line mode. In the on-line mode, actions on data objects are performed concurrently on the wireless computing device and the server. In the off-line mode, some operations such as an update are preformed locally, i.e., exclusively on the local data storage of the wireless computing device, and then the data object, the actions on the data object, and a time that the action was executed are saved on the wireless computing device.

Periodically during the off-line mode, the wireless computing device performs a synchronization: i.e., goes on-line in order to propagate to the remote data storage all data objects and actions saved since the last synchronization. A time interval between synchronizations is either set by a user of the wireless computing device, set by a system administrator on the remote server, or determined by external circumstances such as whether or not the wireless computing device is able to establish a connection with the remote server. In addition, the time interval can be determined by circumstances internal to the wireless computing device or remote server such as whether or not either the wireless computing device or the remote server has made changes to the data objects that need to be synchronized. The time interval between synchronizations can be either regular or irregular and vary from less than a second to longer than a year. During synchronization, the server applies the data objects and corresponding actions to the server data storage either in the order the actions are received or based upon the corresponding timestamps. Update replication enables update operations on data objects to be performed locally when the mobile computing device is off-line. The update operations are saved and forwarded to the remote server during synchronization. The locally performed update operation is then executed on the remote server and results are transmitted back to the wireless computing device.

Advantages of the claimed subject matter include data source independent replication. In other words, the method can support any type of server data source such as relational databases, directory systems, typical file systems or other enterprise systems. Different types of server data sources are supported with "plugins," or hardware or software modules that add a specific feature or service to a larger system. In addition, the claimed technique provides data destination independent replication. Data storage on the wireless computing device can be provided by such systems as a relational database (i.e., Microsoft Access), single-key B-tree storage (i.e., Palm db) or simply a flat file system.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION OF THE FIGURES

Although described with particular reference to mobile wireless computing, the following method is applicable to a number of other industries such as factory inventory management systems and distributed database management systems. The method of the claimed subject matter may be used advantageously in many other data networking settings to maximize limited data bandwidth, whether wireless or not, and to maximize available computer memory.

Figure 1:
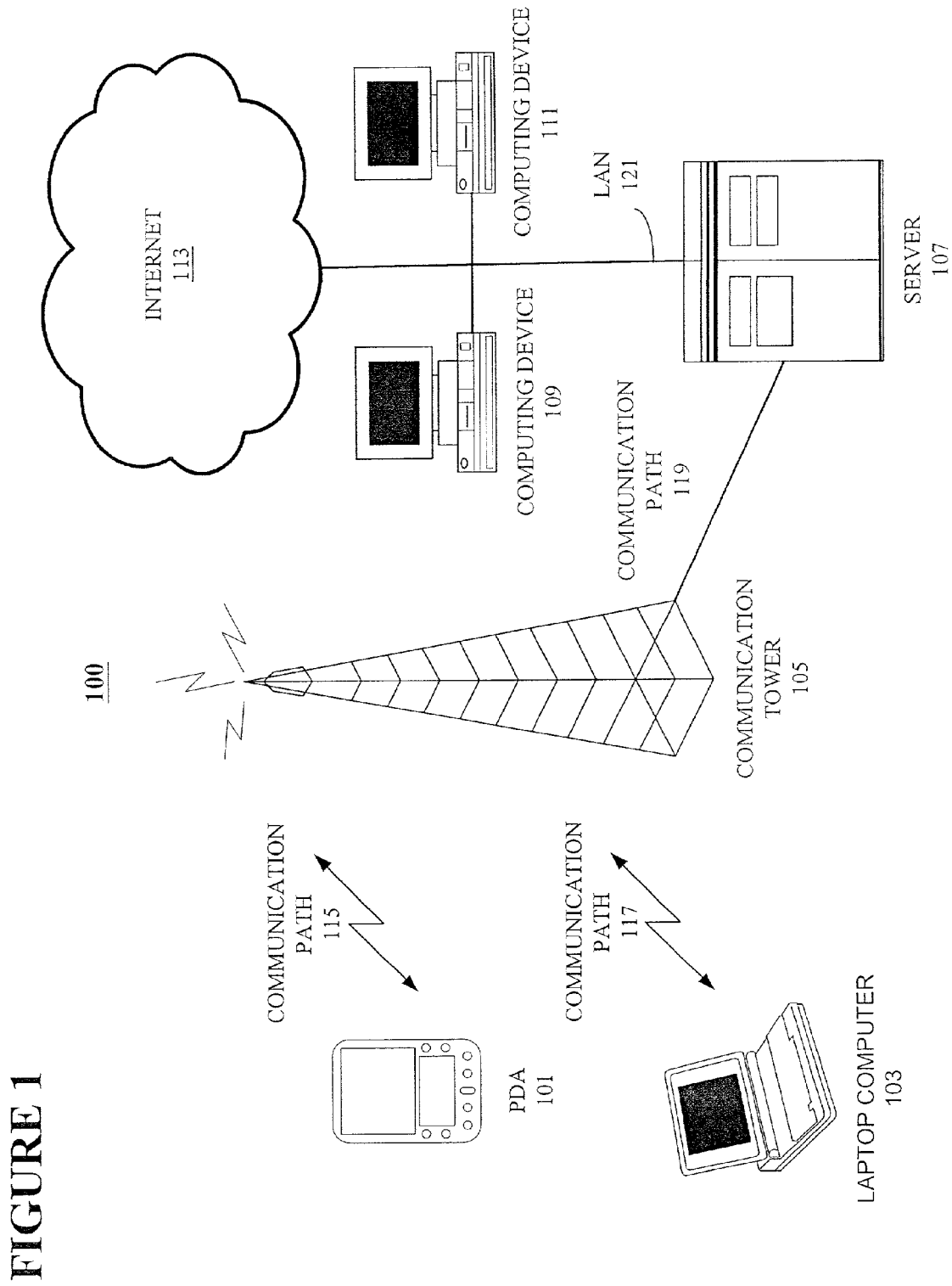
FIG. 1 is a block diagram of a communication system, including two exemplary mobile computing devices that practice the method of the disclosed subject matter.

Turning now to FIG. 1, illustrated is a block diagram of a typical communication system 100 that can support the method of the disclosed subject matter. A communication tower 105 provides multiple wireless, communication paths such as a communications path 115 to a personal digital assistant (PDA) 101 and a communications path 117 to a laptop computer 103. The communication system 100, PDA 101 and laptop computer 103 are examples of types of mobile computing systems and devices that can support the method of the invention. For the sake of convenience, a computing device, whether mobile or not, that employs wireless communication is referred to as a "wireless computing device." Many types of mobile devices, both already in use and yet to be invented, can benefit from the claimed subject matter. For example, many cellular phones in use today can employ the disclosed method to facilitate data and Internet access. Another type of system that can employ the disclosed method is wireless, electronic badges and transmitters and receiver guns that are used to communicate with the badges.

The communication tower 105 is connected, through either a private or public communication line 119 to a server 107. Of course, as should be obvious to those with skill in the art, the communication line 119 may or may not be wireless, i.e. employing wireless communication. The server 107 executes portions of the claimed subject matter and is described in more detail below. The server 107 is coupled to a local area network (LAN) 121, which is attached to a computing device 109 and a computing device 111. The network 121 provides access to the Internet 113 for the server 107 and the computing devices 109 and 111. The PDA 101 and the laptop computer 103 therefore also have access to the Internet 113 via the network 121, the server 107, the communication path 119, and either communication path 115 or communication path 117.

The communication system 100 is used as an example only and many variations of the system 100, and even different types of systems, can also employ the claimed method. For example, the claimed subject matter can be employed in a LAN-based data server configuration. It should also be apparent to one with skill in the art that the disclosed method can be advantageously deployed within almost any communication or other type of system in which either bandwidth and/or device memory is an issue. The claimed subject matter is also not limited to systems which employ wireless communication links; although, this is one area in which the advantages are readily apparent.

Figure 2:
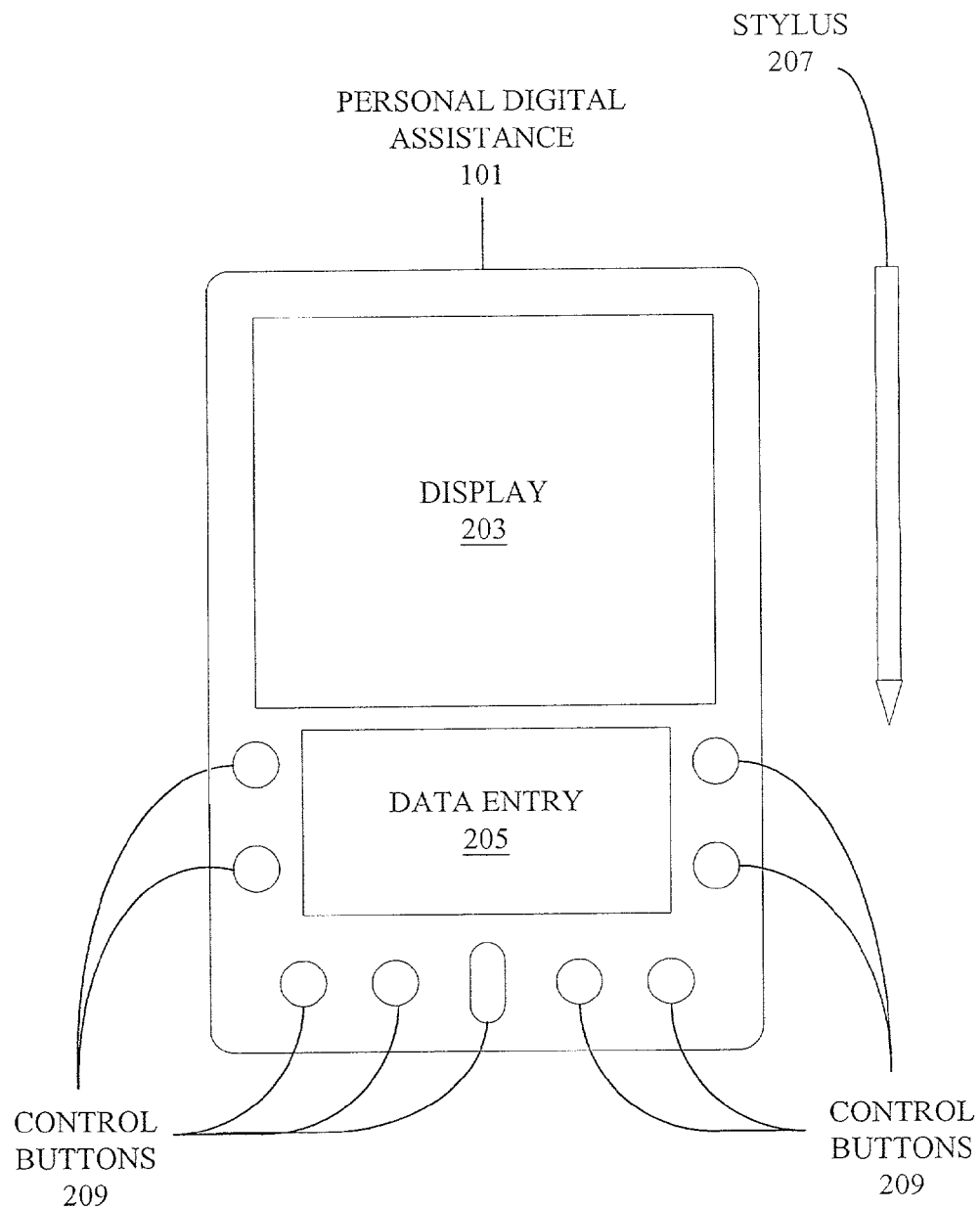
FIG. 2 is a diagram of a typical personal digital assistant (PDA) that implements the claimed subject matter.

FIG. 2 is an illustration of the PDA 101 (FIG. 1), which can implement the method of the claimed subject matter. Input and output for the PDA 101 are provided by a data entry area 205 and a display 203, respectively. The data entry 205 in the disclosed embodiment is a small keyboard on which a user can type information. In addition, the display 203 also provides data entry capabilities. Small icons (not shown) appearing on the display 203 represent pre-defined actions that the PDA 101 can execute. The user can touch a particular icon on the display 203 with a stylus 207 and initiate the corresponding action. Control buttons 209 along the bottom of the PDA 101 enable the user to set various functions such as volume and intensity of the display 203. In an alternative embodiment, the data entry 205 can be programmed to be written upon by the stylus 207 and then hand writing analysis software of the PDA 101 interprets the hand writing to determine an appropriate action.

Figure 3:
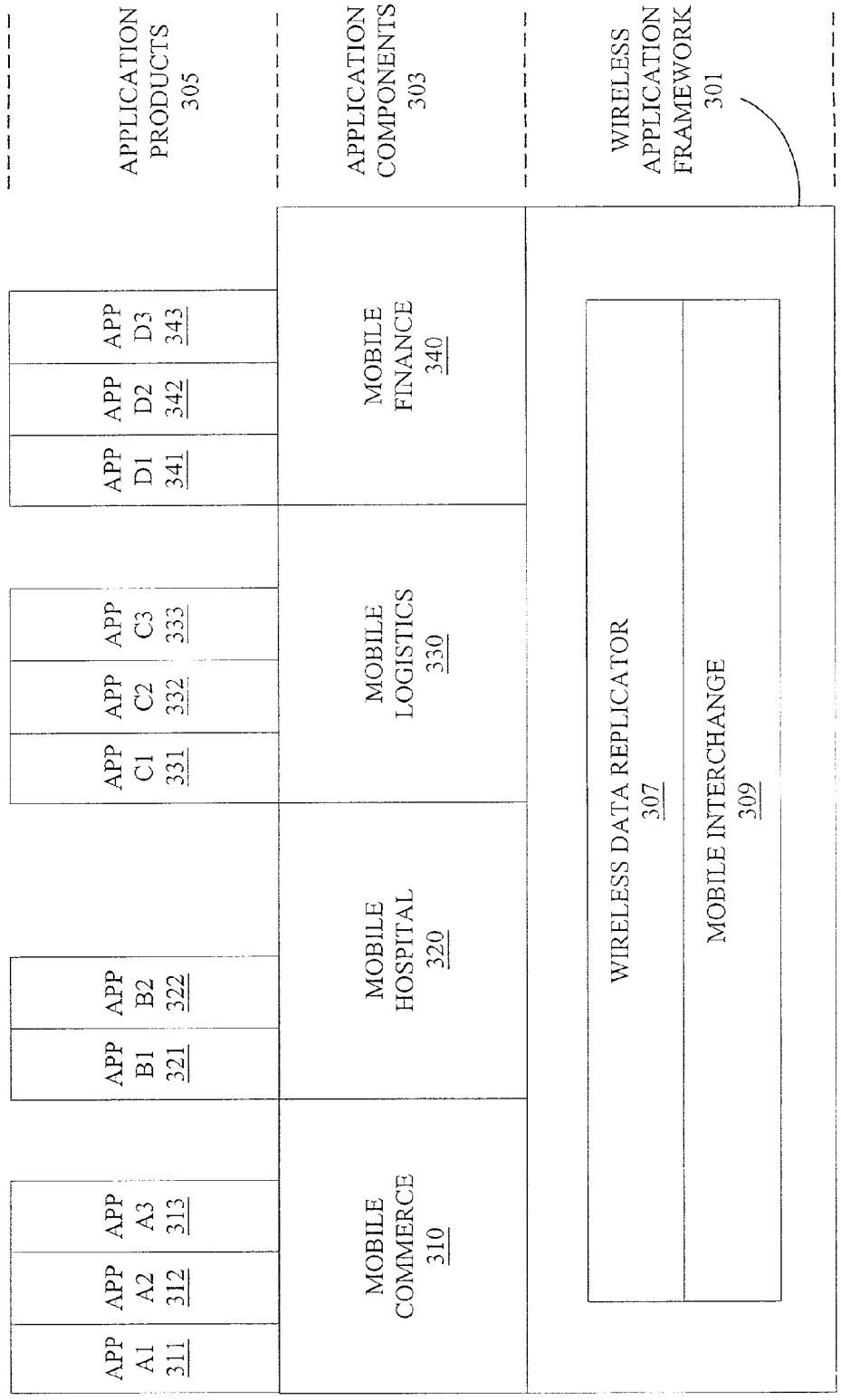
FIG. 3 is a block diagram of an exemplary server architecture that supports the claimed subject matter.

FIG. 3 is a block diagram of an exemplary architecture of a wireless application, libraries of which execute on a client such as the PDA 101 and a server such as the server 107 (FIG. 1), employing the techniques of the claimed subject matter. A wireless application framework 301 includes a wireless data replicator 307 and a mobile interchange 309. The wireless application framework 301 provides services to facilitate development of wireless applications for mobile devices such as the PDA 101. The wireless application framework 301 is standard based and flexible so as to be device, operating system and database independent.

The mobile interchange 309 provides real-time access to an enterprise server or other type of server for both mobile and cross-platform clients. Actions and/or allocations of memory such as procedures and objects, performed or allocated at a server, can be controlled by a client wireless device. In one embodiment, the mobile interchange is based upon extensible markup language (XML), which allows designers to define, transmit, validate, and interpret data between applications and between organizations, and hypertext transfer protocol (HTTP), which is the underlying protocol used by the Internet that defines how messages are formatted and transmitted, and what actions a web server or browser should take in response to a particular command. Both XML and HTTP use a remote procedure call (RPC) paradigm, a popular paradigm for implementing inter-process communication (IPC) between separate processes in different computers across a network. Of course, RPC and IPC can also be implemented within a single computing device. The disclosed wireless application framework 301 provides a compact and efficient environment for developing client/server applications that operate in a wireless architecture.

A client library of the wireless application framework 301 provides the following functionality for an associated, client application:
  (1) generating the contents (method names and parameters) of the remote procedure calls;
  (2) forming an XML message;
  (3) sending the XML message using the HTTP protocol to the server; and
  (4) receiving and interpreting a corresponding response from the server.

A server library of the wireless application framework 301 provides the following functionality for an associated, server application:
  (1) receiving and interpreting a client request, specifically a request that has been generated, formed and sent by utilizing the client library, as described above;
  (2) locating an appropriate procedure, corresponding to the particular RPC requested in the client request;
  (3) invoking the appropriate procedure; and
  (4) sending the appropriate response back to the client.

The RPCs of the disclosed subject matter support the following data types in the wireless environment: integer (4 bytes), boolean, string, date, double, base-64, arrays, structures and hash tables.

The wireless data replicator 307 processes and manages data on the wireless devices. The wireless data replicator 307 enables a user to select the specific information that the user needs on the wireless device and, by replicating only the selected data, saves bandwidth on the transmission medium and memory resources on the wireless device. The wireless data replicator 307 uses the system database as a client data cache and provides each user of a wireless device "data filters," or customizable scripts, which define the data the particular customer selects to store on the mobile device. A data filter may be defined by a particular user on the user's mobile device; or, in the alternative, a menu of commonly used data filters, or "standard filters," can be generated by a system administrator or system programmer and simply selected by the user from a menu depending upon the user's particular set of circumstances and responsibilities. Standard filters may also simply be templates that an individual user can select and then customize. Both data filters and standard filters may be simple, such as an equality match, or complex, such as a multiple table join with multiple criteria.

The wireless data replicator 307 and the mobile interchange 309 provide a platform on which specialized applications can be built. In this example, the specialized applications include a mobile e-commerce application 310, a mobile hospital application 320, a mobile logistics application 330 and a mobile finance application 340. The particular applications 310, 320, 330 and 340 are used only as examples; in actuality, the method of the disclosed embodiment may be employed to implement any application that can benefit from mobile access to a central application or database server. The applications 310, 320, 330 and 340 are each an application component 303 of the system.

Each of the applications 310, 320, 330 and 340 includes application products 305. In this example, the application products 305 of the mobile e-commerce application 310 include an application A1 311 (APP A1), an application A2 312 (APP A2) and an application A3 313 (APP A3). The application products 305 of the mobile hospital application 320 include an application B1 321 (APP B1) and an application B2 322 (APP B2). The application products 305 of the mobile logistics application 330 include an application C1 331 (APP C1), an application C2 332 (APP C2) and an application C3 333 (APP C3). Finally, the application products 305 of the mobile finance application 340 include an application D1 341 (APP D1), an application D2 342 (APP D2) and an application D3 343 (APP D3). Like the application components 303, the specific makeup of the application products 305 is not critical to the spirit of the invention but are used only as examples. For example, the APP A1 311 may be a mobile sales force automation (MSFA) application; the APP B1 321 may be a mobile patient management system; the APP C1 331 may be a mobile delivery management system; and the APP D1 341 may be a mobile banking application.

Figure 4:
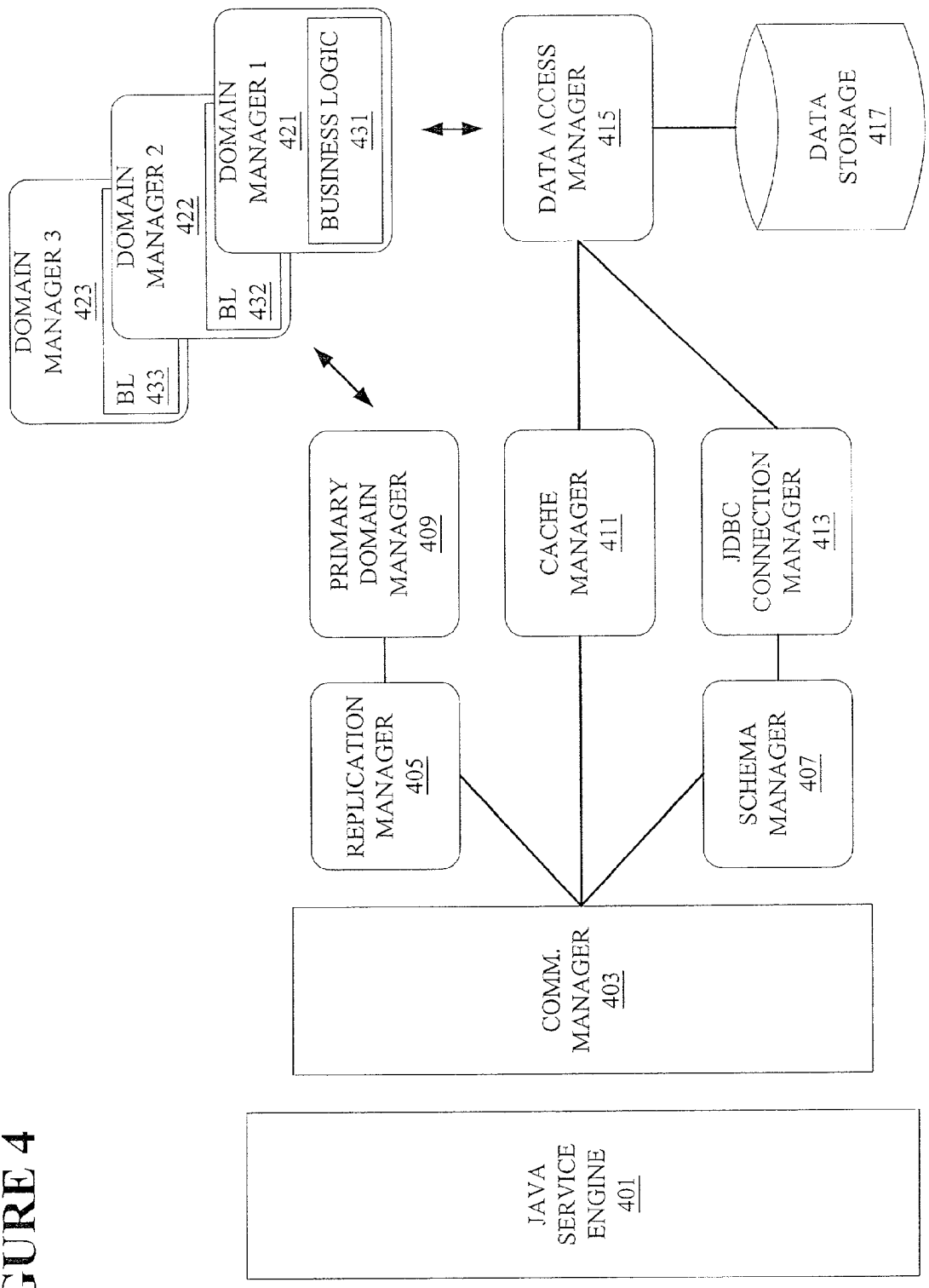
FIG. 4 is a block diagram of the components on a server that implement the techniques of the claimed subject matter.

FIG. 4 is a block diagram of the server components of the disclosed subject matter. The following processes execute on the server 107 (FIG. 1) and support the server library described above in conjunction with FIG. 3. A Java service engine 401 executes software, or Java applets and/or servlets, addressed to it by the other processes. Although this example uses the Java language, the claimed subject matter can be implemented in practically any software language. The specific language is not critical to the spirit of the invention. In the disclosed embodiment, the components are built with Java servlets, which like applets are applications, or collections of software code, that extend the functionality of a web browser and the Java service engine 401. This approach mitigates the need of creating different extensions to connect with different backend systems. The Java service engine 401 can load new servlets corresponding to different backend systems without modifying the Java service engine 401 itself. Thus, a servlet is loaded only the first time it is needed and not every time a request for a particular backend process is made.

A communication manager 403 handles the messages to and from a mobile device, which for the purposes of the following description is the PDA 101. The communication manager 403 maintains a transmission control protocol (TCP) connection from the server 107 to the PDA 101. On the server 107 side of the connection, the communication manager 401 receives RPC calls in the form of byte streams from the PDA 101. The communication manager 403 parses a RPC byte stream, converting the stream parameters into a data structure, and then invokes an appropriate local procedure with the converted data parameters. Results generated by the RPC are then stored in output parameters of the data structure.

Communicatively coupled to the communication manager 403 is a replication manager 405, a cache manager 411 and a schema manager 407. The replication manager 403 handles bi-directional data synchronization issues between clients such as the PDA 101 and the server 107. In addition, the replication manager 403 provides end-to-end transmission transaction control that detects and resolves data conflicts among different clients. Coupled to the replication manager 405 is a primary domain manager 409, which is described in more detail below.

Conflicts between values may be resolved based on one of four procedures. The four procedures are "Last Write," "Timestamp Based," "Value Based," and "Timestamp and Value Based," described as follows:

(1) In the Last Write procedure, the last value written to the database becomes the value of an object. This method is appropriate in situations where it is highly unlikely that multiple people will want to update the same data sets. One problem with this procedure is that it is possible for a first change to over write a later change if the first change is performed off-line and not replicated until after the later change.

(2) In the Value Based procedure, the server 107 accepts a change if the PDA's 101 'old value' matches the current value on the server.

(3) In the Timestamp Based procedure, if a change timestamp is greater (later) than a current timestamp of the object on the server 107, the change is accepted. This procedure assumes that clocks on the PDA 101 and the server 107 are relatively well synchronized.

(4) In the Timestamp and Value Based procedure, a change timestamp provided by the PDA 101 must be later than the change timestamp on the server 107. Additionally, the value provided as the 'old value' by the PDA 101 must match the current value on the server 107. These conditions ensure that the change is recent, and that the user was aware of the current server's 107 representation of the object when making the change.

Note that if both the PDA 101 data repository and the server 107 data repository are capable of handling timestamps at an object attribute level (vs. the object level), then multiple requests to update a particular object may be made during an update operation.

Unaccepted changes to data that are not resolved by the replication manager 405 of the server 107, are stored for review by a system administrator, who can decide on a case-by-case basis whether or not a particular change should be accepted.

The schema manager 407 maintains, for the purposes of this example, two schema, each in XML format. A first, or "main," schema describes the schema of the server 107 and a main database stored in a data storage 417, and the relationship among the main database's tables. Of course, as mentioned above in conjunction with FIG. 1, neither the main database nor the data storage 417 have to be on the server 107, but could, for example, be on one or both of the computing devices 109 and 111 and accessed by the server 107 via the network 121. A secondary schema in the schema manager 407 describes the data organization of the PDA 101. Once data is retrieved from the main database, the schema manager 407 extracts information from the retrieved data based upon the secondary schema, and forwards the extracted information to the communication manager 403 for delivery to the PDA 101. The schema manager 407 may have additional secondary schema in order to extract information for other mobile devices such as the laptop computer 103.

The cache manager 411 provides a cache of data objects previously extracted from the main database in order to make duplicate data requests from the PDA 101 more efficient. The purpose and function of a cache are well known to those with skill in the computing arts.

An open database connectivity (ODBC) connection manager 413 is communicatively coupled to the schema manager 407. In addition to the connection pool services and context services familiar to those with skill in the art, the ODBC connection pool manager 413 pre-establishes a set of ODBC connections between a data access manager 415 and the schema manager 407, obtaining and returning open connections from a ODBC pool and returning all resources at shutdown. The ODBC connection manager 413 also handles connection failures and communication failures.

The data access manager 415 controls access to the data storage 417. Within this specification the data storage 417 is referred to as the "remote" data storage and a data storage on the PDA 101 is referred to a "local" data storage. The designations "local" and "remote" are for convenience only; the data storage 417 could just as easily be called a local data storage and the data storage on the mobile computing device be the "remote" depending upon the perspective of a viewer. The designations "local" and "remote" are based merely upon the fact that the two data storages do not reside on the same device. The data access manager 415 can be any commercially available database management system (DBMS) or a custom constructed system. Specific details of the data access manager 415 are not critical to the spirit of the invention and should be familiar to those with skill in the art.

Data is organized into domains in order to make the storage, collection and dissemination of the data less dependent upon the particular server process such as a DBMS any system may employ. A particular domain contains the definition of a particular object, including the individual data elements, or "attributes," that make up the object. Each attribute has a data type and one or more values. For example, an "account" object may include attributes related to a bank account such as the owner's name and the balance. On a server, an object is also the logical representation of related pieces of data. Each object has a unique identifier, or a unique key to the corresponding object. When a particular object is updated, all the data relating to that object are also updated. Applications such as the mobile e-commerce application 310, the mobile hospital application 320, the mobile logistics application 330 and the mobile finance application 340 (FIG. 3) each have collections of domains that are specific to the particular application.

For example, the mobile hospital application 320 may have a patient object and a doctor object, and the mobile e-commerce application 310 may include product objects. The objects for a particular application 310, 320, 330 or 340 are maintained in domain managers such as a domain manager 1 421, a domain manager 2 422 and a domain manager 3 423. Since different types of objects typically require different types of manipulation, each domain manager 421–423 includes a set of customized functions, or business logic, such as business logic 431, business logic 432 and business logic 433 respectively. The domain managers 421–423 retrieve information related to their respective objects from the data storage 417 via the data access manager 415. Each domain manager 421–423 is a control point for the management of information within a corresponding domain. Procedures such as searches, adds, updates and delete operations are processed through the domain managers 421–423. The business logic 431–433 are customized domain by domain to enable processing that is unique to each particular domain. The business logic 431–433 may also include logic for resolving data conflicts.

In order to prevent unnecessary duplication of software, functions that are common to all the domain managers 421–423 are centralized in the primary domain manager 409. The primary domain object 409 is the base object from which the domain managers 421–423 inherit some of their attributes and methods.

Figure 5:
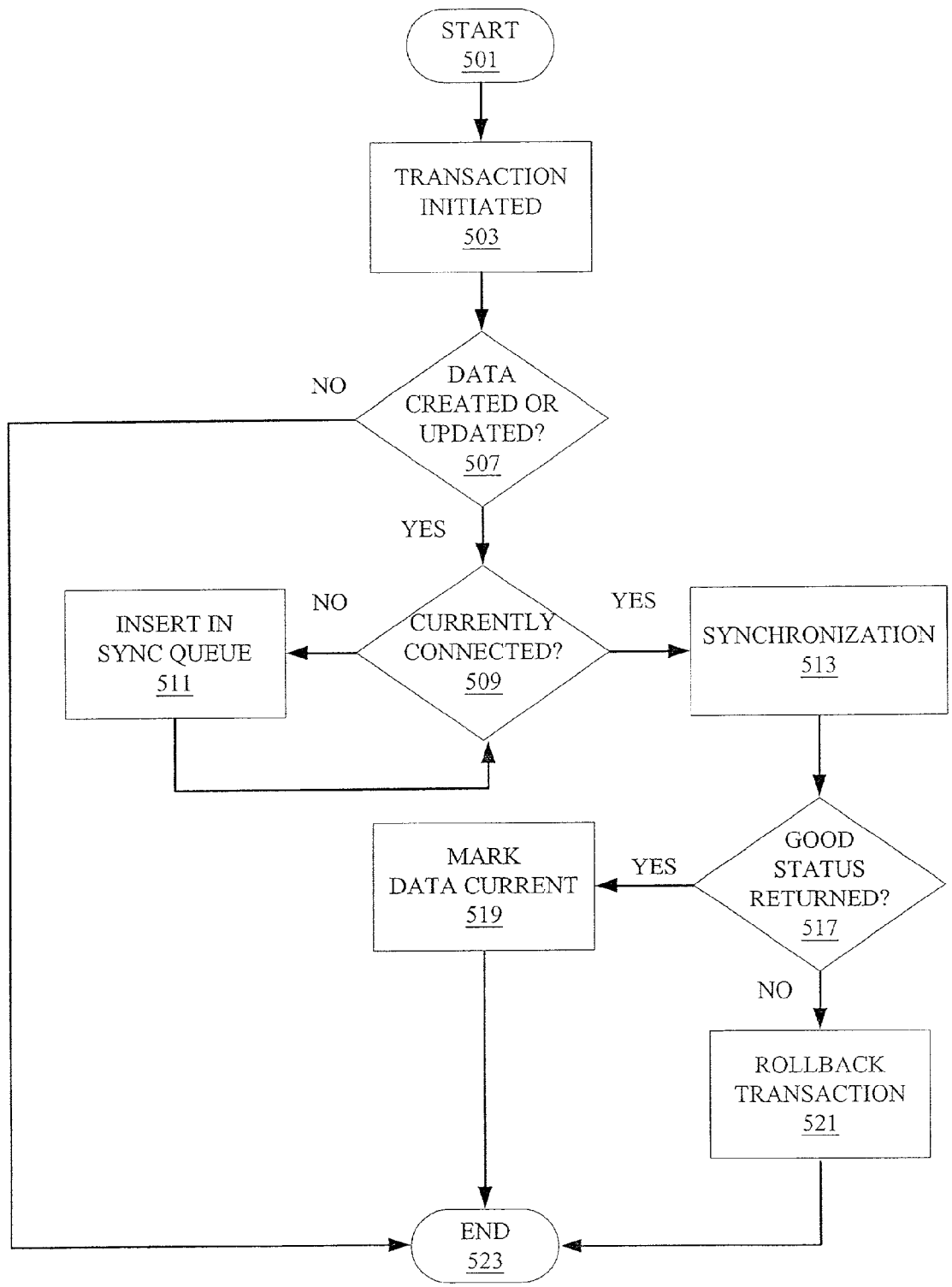
FIG. 5 is a flowchart of a data management process on a client, mobile computing device.

FIG. 5 is a flowchart of a data management process 500 on a client, mobile computing device such as the PDA 101 (FIGS. 1 and 2). The process begins in a Start step 501 and control proceeds immediately to a Transaction Initiated step 503 where a user of the PDA 101 has performed some action that has manipulated data. For example, a sales person using the PDA 101 may accept an offer from a customer to buy a particular baseball. A local database on the PDA 101, which at this point in the example may or may not be synchronized with a centralized database located on the server 107, is updated to indicate a change in the baseball inventory of the business that is represented by the database on the server 107. Of course, once the baseball inventory has been entered into the local database, the local database and the centralized database are not synchronized with each other.

Control then proceeds to a Data Created or Updated step 507 where the process 500 determines whether the transaction represents new data or an update to existing data. An example of new data may be an account object created when the sales person enters information relating to a new customer. Although perhaps unlikely, if the data created or received does not change or create the local database or if the data is marked "not saved" (explained below), control proceeds from step 507 to an End step 523 where processing for this transaction is complete. If the data is new or updated, control proceeds to a Currently Connected step 509 where the process 500 determines whether or not there is a currently active connection between the PDA 101 and the server 107. If not, control proceeds to an Insert In Sync Queue step 511 where that data is placed in an area of memory of the PDA 101 in which pending transactions are stored. In addition, the status of the data is designated as "stale," which is explained in more detail below. If the process 500 determines in step 509 that the PDA 101 and the server 107 are currently connected, control proceeds to a Synchronization step 513.

Both the insertion of data into a synchronization queue represented by step 509 and the synchronization of the data represented by step 513 involve formatting the data into a form suitable for transmission, such as by generating the contents (method names and parameters) of appropriate remote procedure calls and forming an XML message based upon the generated contents and the data created or received in step 503. In order to implement a correct and efficient synchronization, the process 500 assigns one of the following data states to each object:

(1) New: This state designates an object that has been created on the PDA 101 but does not yet exist on the server 107. An "add" object operation, or "method," pertaining to the corresponding object must be transmitted to the server 107 during the next synchronization. Some attributes of the new object such as a unique object key need to be generated by the server 107 and then transmitted back to the PDA 101 with a confirmation that the add operation at the server 107 was successful. Of course, if the add operation is unsuccessful, the server 107 needs to transmit to the PDA 101 this fact so that appropriate action can be taken by the PDA 101.

(2) Updated: An object designated "updated" has been changed in the local, PDA 101 data repository since the last synchronization. Any new values of the object must be transmitted to the server 107 during a synchronization. Any conflict that occurs such as when two sales persons attempt, unknown to each other, to sell the same item is resolved at the server 107 by the replication manager 405 (FIG. 4). The updated object is then retransmitted to the PDA 101 to ensure that the copy on the PDA 101 is the same as the one on the server 107. If the replication manager 405 determines that the object from the PDA 101 is invalid due to a data conflict, then the updated object transmitted to the PDA 101 must indicate that fact.

(3) Not saved: Objects designated "not saved" have been received from the server 107 and stored on the PDA 101. However, the object may be discarded by the PDA 101 if necessary. An example of this may be a data item with attributes that are not expected to change and the PDA 101 needs temporarily. The PDA 101 can change the state of an object from "not saved" to "saved" if the circumstances change.

(4) Saved: An object designated "saved" is considered a permanent part of both local and remote data repositories and should match at least one defined data filter involved in the synchronization process so that its attributes are maintained in a synchronized state.

(5) Stale: An object designated "stale" is maintained in the PDA 101 but is no longer involved in synchronization. The PDA 101 can either keep or purge objects designated stale, depending upon the requirements of the PDA 101 and/or the characteristics of the object itself (6) Deleted: An object designated "deleted" has been removed from the data repository of the PDA 101 and this information needs to be transmitted to the server 107 during a synchronization. A client can remove a deleted object from the local data repository and merely transmit the object's unique key to the server during synchronization or, in the alternative, mark the object for deletion and only remove it from the local data repository once a deletion of the object is successful on the server 107, as indicated during a synchronization.

The manner in which the PDA 101 keeps track of the state of any particular object is not critical to the spirit of the invention. If the PDA 101 maintains objects in a relational database, then an object's designated state may simply be a field in a table. An alternative method of maintaining state information is by segregating objects of different states into different files. For example, a "not saved" object any be placed into a temporary file and only into the data repository if its state is changed to "saved."

The decision in step 509 to proceed to either step 511 or 513 depends upon whether the PDA 101 is in an on-line mode or an off-line mode. If the PDA 101 is in the on-line mode, then control can proceed immediately to step 513 and the XML message created in step 509 is transmitted to the server 107. However, if the PDA 101 is in the off-line mode, the process 500 proceeds to step 511 where the XML message is inserted in a synchronization queue and then proceeds back to step 509 where the PDA 101 waits until a connection to the server 107 is established. The PDA 101 periodically checks to see either whether a connection has been established, such as when connection periods are regularly scheduled events or when data transfers are initiated by the server 107, or whether the conditions exist for a connection to be made, in the case of a PDA 101 that is configured to initiate a connection when the PDA 101 has one or more messages to transmit. If a new transaction is initiated while the PDA 101 is waiting for a connection to the server 107, the process 500 processes the new transaction like the previous transaction, placing the new transaction into the synchronization queue and waiting for a connection so that a synchronization can occur with respect to all the transactions in the synchronization queue.

As mentioned above, the period between synchronizations can be fixed or variable. A synchronization schedule can be established using a user interface ("UI") on either the PDA 101 or the server 107. The same UI can be employed by a user either on the PDA 101 or the server 107 to initiate a synchronization. If no connection between the PDA 101 and the server 107 is available at the time a synchronization is initiated, the device 101 or 107 that initiated the synchronization recognizes this condition and leaves the request in a synchronization queue and then periodically tests for either the existence of a connection or the conditions necessary to establish a connection. Once a connection is established, synchronization proceeds and control proceeds to step 513.

The process of synchronization keeps local copies of data objects the same as corresponding objects on the server 107. The synchronization of the disclosed subject matter is based upon data filters, which are explained in more detail below in conjunction with FIGS. 9–12. Copies of data objects on the PDA 101, i.e., "local" or "client" data, are synchronized with the corresponding data objects on the server 107, or "server" data, by means a series of client/server exchanges.

The Synchronization step 513 begins when the PDA 101 sends a syncRequest object to the server 107. The syncRequest object encapsulates all data the PDA 101 needs to provide the server 107 in order to execute a particular synchronization action, including a timestamp, an optional filter, an optional list, or "vector," of objects to be synchronized, or "syncObjects," and an optional location object that includes information corresponding to a current geographical position of the PDA 101. In an alternative embodiment, the location object can be a vector that includes not only information corresponding to a current position but also information about future geographical positions of the PDA 101.

There are six synchronization actions, or operations; a syncFilter operation, a getdeletes operation, a getCreates operation, a sendChanges operation, a sendCreates operation and a sendDeletes operation. The six operations are described in more detail below in conjunction with FIG. 6. Each operation takes two parameters, a syncRequest object and a second field, or "result flag," that indicates what information the PDA 101 wants returned from the server 107 in response to the syncRequest object. The result flag is set to one of the following values:

(1) All: A result flag of "All" means that the server 107 should return the status and object for all object IDs associated with the operation. The "All" value should be used judiciously because it will drastically increase the amount of communication necessary between the PDA 101 and the server 107.

(2) Updates: A result flag of "Updates" means the server 107 should return the IDs and statuses of all objects associated with the operation. In addition, a copy of the object should be returned when the copy on the server 107 may be different than the copy on the PDA 101.

(3) IDs: A result flag of "IDs" means the server 107 should return the object IDs and statuses of all objects operated on during the operation. Additional messages may be returned based upon the operation type.

(4) Failures: A result flag of "Failures" means the server 107 returns only error messages for objects that could not be processed during the operation.

(5) Silent: A result flag of "Silent" means the PDA 101 is not interested in receiving any information on the operation and the server 107 should process the entire request, sending to the PDA 101 only the information that the operation is complete.

Figure 6:
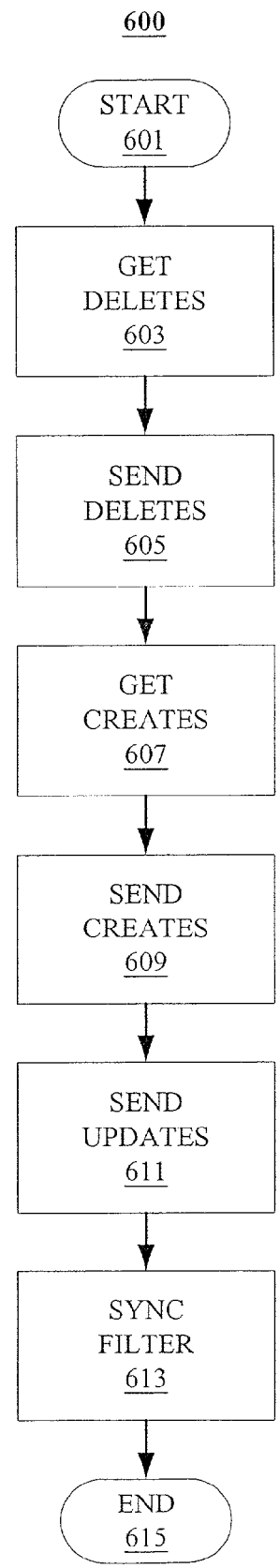
FIG. 6 is a flowchart of a synchronization step introduced in FIG. 5.

The result flags as they relate to specific operations is discussed in more detail in conjunction with FIG. 6. The syncRequest timestamp denotes the last time the particular synchronization operation was executed. If a data filter is specified, the server 107 uses the data filter to limit the scope of the return set of data, or the "syncResult object."

If the optional location object is included in a syncRequest object, then the scope of the return data is further limited based upon the positional information included in the location object. For example, a user of the PDA 101 in a first city may have information on restaurants in the first city stored in the local data storage of a PDA 101. When the user travels to a second city, a syncResult object would contain information corresponding to restaurants in the second city. The location information can be based upon a public system such as the global positioning system (GPS) or cellular telephone towers or on a private system such as transmitters placed in hospital rooms that simply broadcast the room number a limited distance. The location object may also be a vector that includes information on a future position. Using the transmitters as an example, a doctor can specify future rooms in the vector and have information downloaded to his PDA 101 that corresponds not only to the patient in the current room but patients in the next room on his rounds.

Each syncObject in the vector includes a timestamp, an object ID, a base object, an object status flag, an old values object and an optional message field. Not all of these parts of the syncObject need to be specified in any particular action. For example, during an add operation, the syncObject does not need to specify an old values object; during a delete object operation, only the object ID may be necessary; and the old values object is used primarily only during an update operation. The syncObject timestamp represents the time that a particular object was updated or verified at the server 107. If the syncObject timestamp is not specified in a particular syncObject, then the server 107 applies the syncRequest timestamp to the syncObject. The object ID specifies a unique ID of a base object that describes the entire syncObject. The status flag and message filed describe a syncObject's state as a result of the operation and is used primarily in a syncResult object.

After the server 107 has completed the actions specified in the syncObject, the server 107 transmits a syncResult object to the PDA 101. The syncResult object includes a timestamp and a vector of syncObjects. The syncResult timestamp indicates the time at which the corresponding synchronization was executed on the server 107. The timestamps on each syncObject of the syncResult object indicates the time at which the corresponding action associates with the syncObject was executed. Typically, each syncObject in the syncResult has the same timestamp, but, if a timestamp is not specified, the syncResult timestamp can be used.

The status field of a syncObject in the syncResult object represents the object's relation to the corresponding operation and is filled with one of the following codes:

(1) Updated: A status of "Updated" means the copy on the server 107 is different than the copy on the PDA 101. This status may mean that another client has updated the data object in the database prior to the time the server 107 received the syncRequest and the PDA 101 needs to determine an appropriate action to resolve the conflict.

(2) Succeeded: A status of "Succeeded" means the syncObject was successfully processed on the server 107 and no changes were made to the syncObject while the server 107 fulfilled the request.

(3) Failed: A status of "Failed" means the server 107 was unable to perform the requested operation on the particular syncObject. In this case, the message field contains a text message as to the nature of the failure.

(4) Same: A status of "Same" means that the corresponding object on the server 107 has not changed since the timestamp on the syncObject.

(5) New Match: A status of "New Match" means the object described by the corresponding syncObject is new to the server 107 or to the particular request since the last time the PDA 101 made the request.

(6) Not Matched: A status of "Not Matched" means the server 107 could not find the corresponding object, perhaps because it has been deleted or changed to the extent that it no longer matches the data filter provided with the syncRequest object.

The status field and its meaning with respect to specific operations is discussed in more detail below in conjunction with FIG. 6.

Once the Synchronization step 513 is complete, the process 500 proceeds to a Good Status Received step 517 where information concerning objects involved in the synchronization step 513 is checked by analyzing a return message from the server 107. If the return, or status, message indicates that a particular data update or creation was correctly performed, then control proceeds to a Mark Data Current step 519 where the value of the object in the local data repository is confirmed as matching the value of the object in the server 107 data storage 417. If the return message for a particular item indicates that an update or creation operation was not carried out on the server 107, then control proceeds from step 517 to a Rollback Transaction step 521 where the corresponding object is also set as equal to the value of the object in the server 107 data storage 417. In addition, any action taken on the PDA 101 that depended upon the creation or update of the data object must be examined to determine what further action is necessary.

Following completion of both step 519 and 523, the process 500 proceeds to the End step 523 where the process 500 is complete. It should be noted that steps 517, 519 and 521 are iterative in nature. In other words, if a synchronization involves multiple objects such as when objects are processed from the synchronization queue, return messages corresponding to each object must be processed through the steps 517, 519 and 521 prior to control proceeding to the End step 523.

FIG. 6 is a flowchart of an exemplary synchronization process 600 corresponding to the Synchronize step 513 (FIG. 5). The process 600 begins in a Start step 601, which is initiated when the syncRequest operation is initiated as described above in conjunction with FIG. 5. Each of the following steps represents an operation sent in conjunction with a syncRequest object. From step 601, control proceeds immediately to a Get Deletes step 603 which is associated with a getDeletes operation. The getDeletes operation retrieves all objects that have been deleted from the server 107 since the last time the getDeletes operation was executed.

The getDeletes operation sends a timestamp and an optional list of object IDs to the server 107 in the corresponding syncRequest object. Typically, there is no data filter associated with this operation. However, a data filter can be sent if a particular server 107 executes a two-step delete/destroy process. The getDeletes timestamp should be set to the last time the PDA 101 sent a getDeletes operation (corresponding to a given data filter if a data filter is sent). If the optional list of IDs is sent to the server 107 with the getdeletes operation, then the server 107 responds to the PDA 101 by transmitting a syncResult object, described above in conjunction with FIG. 5, that contains the statuses of objects, both deleted or not deleted, with IDs on the list. If a data filter has been sent, then only the statuses of objects matching the filter are sent. Otherwise, the server 107 responds by sending a syncResult object that contains a list of IDs of all objects that have been deleted since the last synchronization. The timestamp of the syncResult object is saved by the PDA 101 and used as the timestamp of the next syncRequest object. The PDA 101 compares the list of returned IDs with its stored objects and makes appropriate changes to the local database.

If the result flag of the syncRequest object is set to "All," then the server 107 returns the IDs of all objects deleted since the last getdeletes operation. If a list of IDs was provided, the syncResult object will also contain the status of each ID on the list. A status of "Not Matched" indicates that the corresponding object no longer exists on the server 107, A status of "Updated" indicates that the corresponding object exists on the server 107 and has been updated since the timestamp on the getDeletes operation. In this case, a copy of the "Updated" object is also returned to the PDA 101.

The Updates, Failures and Silent settings of the result flag does not apply to this operation. The IDS setting of the result flag causes the server 107 to return IDs for all objects deleted since the last getDeletes operation was executed. If a list of IDs is provided, then the server will return the status of each ID on the list. In this case, the status will be either "Matched" or "Unmatched" and copies of updated objects are not returned.

Following step 603, the process 600 proceeds to a Send Deletes step 605 where any object deleted in the local database of the PDA 101 is reported to the server 107 via the transmission of a SendDeletes object, containing a list of object IDs of the deleted objects, in a SyncRequest object. The server 107 makes appropriate changes to the server database and responds to the PDA 101 by indicating which of the objects were successfully deleted from the server 107 data storage 417.

After the Send Deletes step 605 has completed, the process 600 proceeds to a Get Creates step 607. During the Get Creates step 607, the PDA 101 sends a time stamp and an optional data filter to the server 107. If a data filter is not specified, the PDA 101 retrieves all data objects created on the server 107 since the last time the last getCreates operation was executed. If a data filter is specified in the syncRequest object that transmits the getCreates operation, only new objects created that conform to the data filter and were created after the time of the timestamp are returned. No object IDs are sent in this operation. The server 107 responds with a vector of syncObjects, each representing a base object of a newly created object. The status of the returned objects is "New Match" and the timestamp corresponds to the creation date of the object on the server 107.

The result flags that are valid in the syncRequest are the All flag, which causes the server 107 to return all created objects, and the IDs flag, which causes the server 107 to return the IDs of the created objects but not copies of the objects themselves. The Updates, Failures and Silent flags do not apply to this operation.

Following completion of the getCreates step 607, control proceeds to a Send Creates step 609, where the PDA 101 creates a list of newly created objects in the local repository by querying the local depository for all objects with a status of "New." These "new" objects are sent to the server 107 along with a timestamp of the last time the sendCreate operation was performed. This timestamp information is employed by the replication manager 405 (FIG. 4) to detect and resolve any potential data conflicts and, if possible, add the objects to the database on the server 107. In the send-Creates operation, no data filters are specified and the PDA 101 creates a temporary ID, or identifier key, for each object in the request which the PDA 101 uses to relate the object to an object ID sent by the server 107 in a corresponding syncResults object.

Once the server 107 receives the syncRequest object from the PDA 101, the server 107 generates the corresponding syncResult object, which includes a base object, which may not be the same as the new object sent by the PDA 101, showing the new object as recreated in the serve's 107 database. If the result flag of the syncRequest object is set to "All," the syncResult object contains all objects and sub-objects involved in the sendCreate operation. This includes the base object showing the added object after the operation, added objects that were updated during the sendCreate process, and failure results for objects that could not be added. The "All" result flag setting is the only setting in which both the object and a status of "Succeeded" is returned. A status of "Succeeded" means that the object was added to the server 107 database without any changes. If the result flag is set to "Updates," an ID and a status of "Succeeded," but no object, is returned. If the status of the added object is "Updated," then the ID, the status and a copy of the object are returned. Typically, this situation implies that there were fields, not present in the original request, that needed to be set by the server 107. In this case, the object ID, set by the server 107, is returned in the message field. If the add fails, for any particular object, a status of "Failed," an error message in the message field and the original object are returned to the PDA 101.

If the syncRequest object sets the result flag to the value "IDs," the syncResult object includes only the server-created IDs and the statuses of all objects sent—no objects are returned to the PDA 101. If the result flag is set to the value "Failures," then the syncResult object contains only the temporary ID, the status and a message relating to the reason for the failure. If the result flag is set to the value "Silent," then no information is returned to the PDA 101 about whether or not an operation succeeded or failed.

If the result flag is set to the value "All" or "Update," the client should update the local data repository based upon the results as indicated by the syncResult object. If the result flag is set to the value "Failure" or "Silent," the PDA 101 should take steps to ensure the local information is still correct. If a syncResult object returns a status of "Failed," then the PDA 101 should take steps to correct the problem, perhaps by resubmitting the corresponding operations. Once the sendCreate operation is confirmed to be complete on the server 107, as evidenced by a suitable syncResult object, the original object can be deleted from the local data repository. If a newly created object matches a filter, it will be recreated at the next synchronization. This ensures that the PDA 101 has an accurate representation of the object. In some instances, the server 107 will fill in default fields, or otherwise update the new object before adding the object to the database.

If the PDA 101 is unable to determine that the server 107 has completed an add operation, then the PDA 101 cannot know whether or not all adds were received and/or processed by the server 107. The next time the PDA 101 connects to the server 107, the PDA 101 should attempt to determine if the previous adds were successful, if this information can still not be determined, the PDA 101, or more precisely the mobile e-commerce application-310 which is executing the operations, should prompt the user to either resubmit the add requests, or remove the add request requests from the local data repository.

Once the Send Creates step 609 is completed, control proceeds to a Send Updates step 611 where the PDA 101 sends to the server 107 information on objects in the local data repository that have changed since the last time a sendCreate operation was executed. The PDA 101 fills in the timestamp field of the SyncRequest object with the timestamp of the last time sensCreate operation was executed. The PDA 101 also sends a vector of SyncBaseObjects.

For each object in the local data repository that has changed, the PDA 101 creates a syncBase object. The syncBase object contains the timestamp of the particular change(s) represented by the syncBase object. The ID field is filled in with the unique ID of this particular object. The PDA 101 also submits an updated base object in a base object field of the syncBase object. Only values that have changed need to be present. Old values are placed in another base object, one that contains the old attribute/value pairs, i.e., not the modified ones' values. The only values that need to be present are the original values for attributes listed in the changed base object. For example, if one value of the object is changed, the original value should be in the old values base object, and the new value should be in the base object. The ID field of the syncBase object is the only guaranteed indicator of the target object for the change.

The following describes information returned by the server 107 based on a particular result flag setting for the sendCreate operation.

(1) If the result flag is set to the value "All," the server 107 returns the IDs of objects that were successfully updated and an error message for those objects which could not be updated. The current version of all objects after all updates have been processed will be returned to the client (2) If the result flag is set to the value "Updates," the server 107 returns a status for each object in the request. Objects that were successfully updated will not be returned. For objects that were not successfully updated, the return set includes the ID of the updated object, and the status and the current version of the object as it is stored on the server 107. The PDA 101 can use the current version of the object to update its local data repository.

(3) If the result flag is set to the value "IDs," the server 107 returns the IDs and statuses of all objects in the request. No objects are returned to the PDA 101.

(4) If the result flag is set to the value "Failures," the server 107 returns a result set that only includes IDs, statuses, and failure messages relating to objects that could not be updated on the server 107. The server 107 does not return the current versions of the object objects.

(5) If the result flag is set to the value "Silent," the server 107 returns no information to the PDA 101 about whether or not updates were successfully executed.

Following the Send Updates step 611, control proceeds to a Sync Filter step 613, where the user has the option to save a data filter for later use. Saved data filters are stored in a filter table in the local data repository on the PDA 101. The server 107 may also save the data filters, associating each with a user ID and a data filter ID so that during a synchronization the PDA 101 can send data filter IDs rather than actual data filters. If the stored filter is run locally, no information is stored besides the data filter's search string, filterName, and whether the data filter should be synchronized. If the data filter is executed on the server 107, a list of returned IDs is also saved with the data filter.

Data filters can be synchronized in batches or one at a time. For each data filter, the PDA 101, or more specifically the mobile e-commerce application 310 that executes the data filter, supplies a list of IDs that matched the data filter the last time synchronization was performed using that filter. The PDA 101 passes to the server 107 a vector of syncRequest objects. Each syncRequest object contains a search string and a vector of syncObjects. Within each syncObject, the PDA 101 fills in the object's ID, and the timestamp for that particular object.

The server 107 returns a vector of syncResult objects. The return vector will have one syncResult object per syncRequest object. Each syncResult object will contain the executed filter, a timestamp showing when the filter was executed, and the vector of syncObjects. Each syncObject has a field describing its presence in the result set using one of the following four states.

(1) If a syncObject is listed as "Same," the object identifier was included in the request set of IDs. In other words, the PDA 101 already knows that the object matched the filter. Furthermore, the object has not been updated since the timestamp provided with that object in the syncRequest object. Therefore, the PDA 101 does not need to make any changes to the local data store. The server 107 can opt not to return this object to the PDA 101 in order to reduce network traffic based on the operation flag. If the object ID is missing from the result set, the PDA 101 can assume that the object still matches the filter and remains unchanged. The PDA 101 then updates the timestamp associated with the local copy of the object to the timestamp provided in the syncResult object. After the timestamp is updated, the state of the local copy of the object should be "Saved" regardless of its previous state. Missing IDs are left in the list naming IDs that match this filter.

(2) If the syncObject is listed as a "New Match," this object's ID was not provided in the set of known IDs in the syncRequest object. In other words, the object did not match the filter the last time this filter was synchronized. In this case, the entire object is returned to the PDA 101. The PDA 101 saves this object to the local data repository, and updates the timestamp to the timestamp provided in the syncRequest object. The status of the object in the PDA's 101 data repository is then set to "Saved" and the object ID is added to the local list of IDs matching the filter.

(3) A syncObject with a status of "Updated" means that the corresponding ID was in the previous result set, sent in the syncRequest object. However, the object has been updated since the timestamp for that object provided in the sync request. The entire object is returned to the PDA 101. The PDA 101 saves this object to the local data repository and updates the timestamp to the timestamp provided in the syncRequest object. The local status of the object in the PDA's 101 data repository is set to "Saved" and the object ID is left in the list of IDs matching the filter.

(4) A syncObject of status "Not Matched" was sent in the syncRequest object as previously matching a particular filter. However, the object has since been updated or deleted, and no longer matches the corresponding search string. The PDA 101 sets the object state in the local data repository to "Stale" and the object ID is removed from the list of IDs matching the filter. If the object does not exist in the local data repository, then the object ID can be removed from the list of IDs.

For each data filter synchronized, the PDA 101 saves the filter, the timestamp representing the time the filter was last run and the list of IDs matching the filter each time the filter is executed.

With the syncFilter request, the PDA 101 provides the result flag indicating how much information should be returned. The following lists what results the PDA 101 can expect based on this flag.

(1) If the value of the result flag is "All," the server 107 returns all objects that match the search string of the data filter. The object status will be filled in, and the entire object will be returned. If an ID no longer matches the filter, the object is marked "Not Matched" and the ID is returned. In this case, no object is returned.

(2) If the result flag is set to the value "Updates," the server 107 returns the IDs of all objects that match the data filter. The server 107 does not return the entire object for those objects with a status of "Same." Objects are returned if marked "Updated" or "New Match." The server 107 also indicates which objects no longer match the filter by marking them with a status of "Not Matched."

(3) If the result flag is set to a value of "IDs," the server 107 returns objects marked "Updated" or "New Match." The server 107 also indicates which objects no longer match the filter by marking them "Not Matched." The server 107 does not return the ID or the object for any object listed as "Same."

(4) The "Failures" and "Silent" settings for the result flag do not apply to this operation.

Following completion of the Sync Filter step 613, the process 600 proceeds to an End step 615 where the synchronization procedure is completed. Although FIG. 6 illustrates the process 600 as a series of discrete steps, this is not required by the claimed subject matter. For example, all the steps may be combined into a single syncRequest object and the server 107 can process the different operations as the server 107 sees fit, e.g., in the order suggested by FIG. 6 or in some other order.

Figure 7:
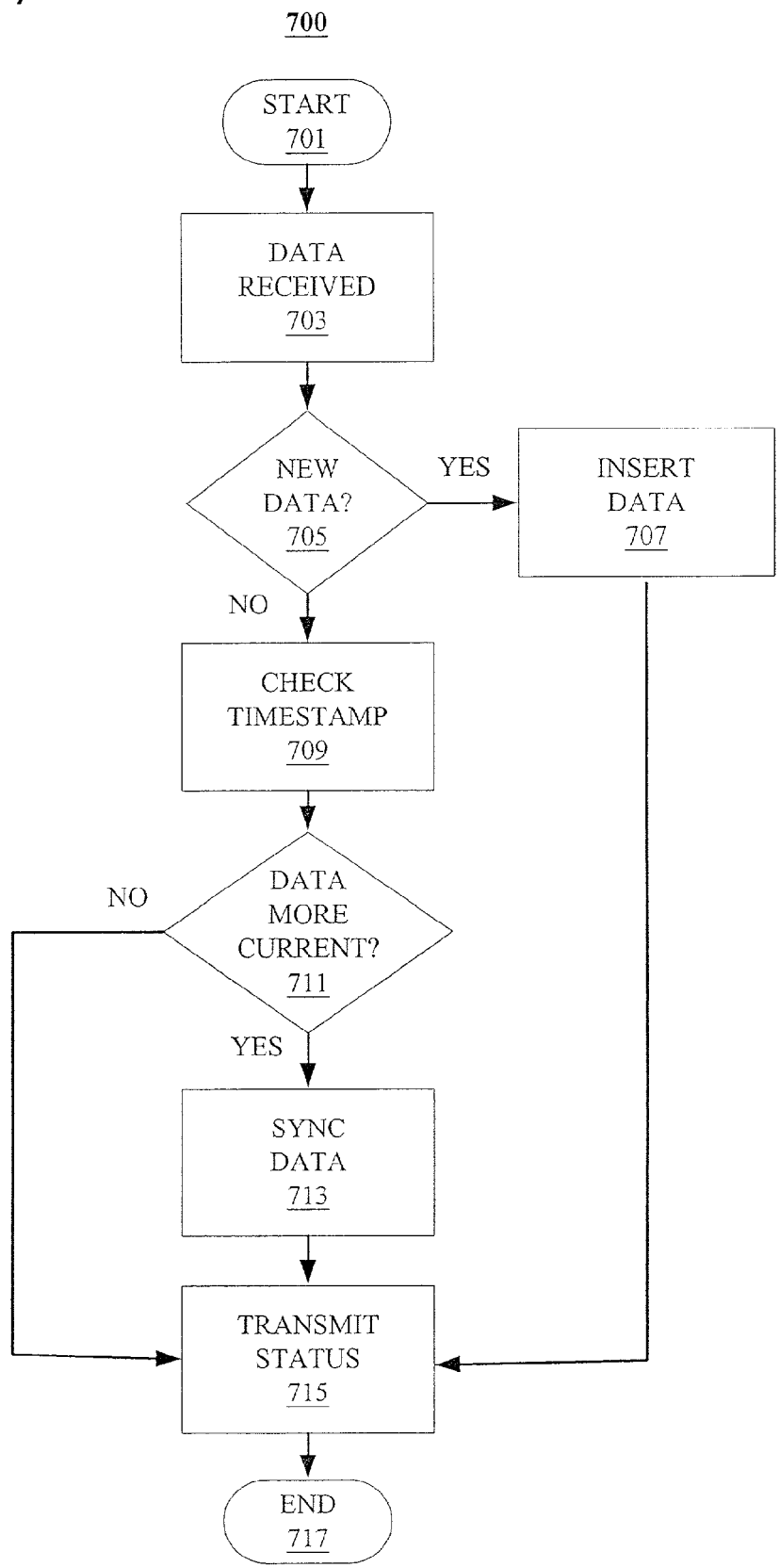
FIG. 7 is a flowchart of data management process on a server that supports the client, mobile computing device of FIG. 5.

FIG. 7 is a flowchart of a data management process 700 on the server 107 that supports the PDA 101. The process 700 begins in a Start step 701 and control proceeds immediately to a Data Received step 703. Typically, step 703 would be in conjunction with a Synchronization step 513 (FIG. 5). Control proceeds from step 703 to a New Data step 705 where the process 700 determines whether or not the data object received in step 703 has a designated status of "New," as explained above in conjunction with FIG. 5. If the data is new, then control proceeds to an Insert Data step 707 where a new data object is created and inserted into an appropriate place in the data storage 417 (FIG. 4) by the data access manager 415 (FIG. 4). Control then proceeds to a Transmit Status step 715 where a return message is prepared for the PDA 101 that transmitted the data object, to inform the PDA 101 of the results of the data creation operation.

If in step 705 the process 700 determines that the data object is not a new object but rather designated as "updated" by the PDA 101 that transmitted it, then control proceeds to a Check Timestamp step 709 where the process 700 compares a timestamp on the transmitted object with a timestamp on the corresponding stored object. If the stored data object is more current than the transmitted data object, then the stored object is not updated and control proceeds to the Transmit Status step 715 where the PDA 101 is informed via a return message that the update operation failed. If in step 711, the process determines the timestamp on the transmitted object is later than the timestamp on the stored object, then control proceeds to a Synchronize Data step 713, where the stored object is replaced with the transmitted object. Then, control proceeds to the Transmit Status step 715 where the PDA 101 is informed of a successful data update via a return message. It should be noted that the process is iterative in that multiple data items can be transmitted by the PDA 101 to the server 107 and that each transmitted data object is processed through the process 700 before a synchronization is complete.

Figure 8:
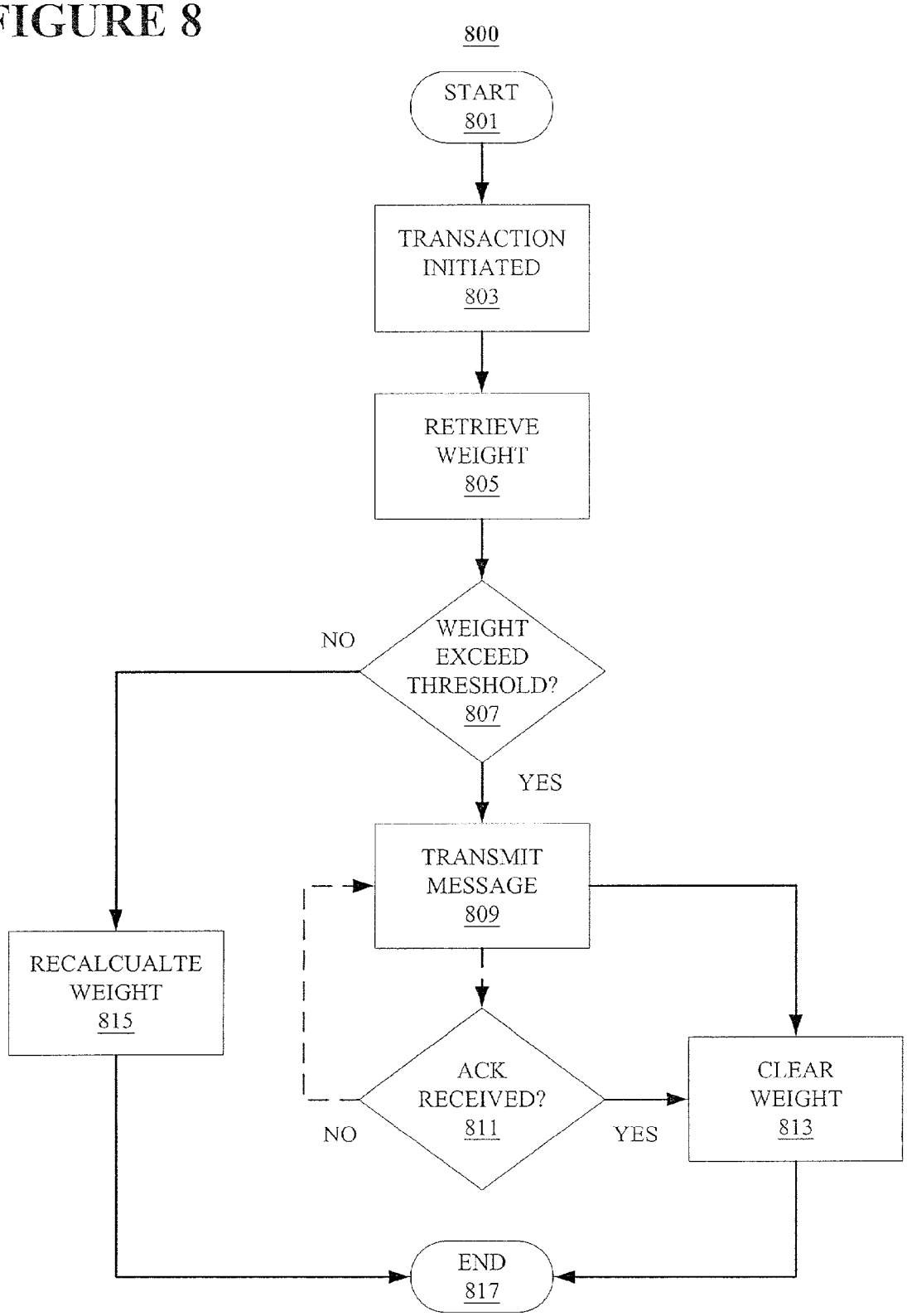
FIG. 8 is a flowchart of an update notification process of the claimed subject matter.

FIG. 8 is a flowchart of an Update Notification process 800 that executes on the server 107 (FIG. 1). The process 800 begins in a Start step 801 and proceeds immediately to a Transaction Initiated step 803 where some operation has been performed on data in the remote data storage 417 (FIG. 4). In this example, the operation is either an update, add or delete operation and corresponds to a data filter associated with the user ID of the user of the PDA 101 (FIG. 1). Each operation/data filter pair is associated with a weight value, a threshold value and, in an alternative embodiment a cumulative weight value. In some cases, the weight value and the threshold value may be the same. Once the transaction has been executed in step 803, control proceeds to a Retrieve Weight step 805 where the operation and the target(s) of the operation are compared to a list of data filters on the server 107. If the operation corresponds to a particular data filter, then a corresponding weight value for the operation/data filter pair is retrieved. In the cumulative weight embodiment, a cumulative weight value is also retrieved. The cumulative weight value is an accumulation of weight values from previous iterations of the process 800 with respect to the particular operation/data filter pair. Control proceeds to a Weight Exceed Threshold step 807 where the weight value is compared with the threshold value. In the cumulative weight embodiment, the cumulative weight value associated with the operation/data filter pair rather than the weight value is compared to the threshold value.

If neither the weight value nor the cumulative weight value, if there is one, exceed the threshold value, then control either proceeds to a Recalculate Weight step 815, in the cumulative weight embodiment, or to an End step 817, in the non-cumulative weight embodiment. In the End step 817, the processing with respect to this particular operation is complete. In the Recalculate Weight step 815, the weight value retrieved in step 805 is added to the cumulative weight, which is then stored in the data storage 417 in place of the old cumulative weight value. Control then proceeds to the End step 817.

In step 807, if either the weight value or the cumulative weight value, if there is one, exceeds the threshold value, then control proceeds to a Transmit Message step 809. In step 809, the PDA 101 is notified via a notification message that a synchronization to the local data storage is either required or recommended. The notification message is transmitted from the server 107 to the PDA 101 via a short messaging service (SMS) message. SMS is a pager-type service well known to those with skill in the art, and is only one example of a transmission medium for practicing the techniques of the disclosed subject matter. Each SMS message includes a data domain name, the name or some other identification of specific data filters that require an action, the type of action required, and whether or not the action needs to occur immediately. For example, if the SMS message is marked as "immediate," then the PDA 101 may need to establish a communication link and perform a synchronization at that moment. If the SMS message is marked as something other than "immediate," then the PDA 101 may either synchronize immediately, wait for the next scheduled synchronization period, or put a message into a user calendar to inform the corresponding user of the need for a synchronization of the local data storage.

Following step 809, the process 800 proceeds to an Acknowledgement Received step 811. Step 811 is an optional step as indicated by the dotted lines. If the process 800 requires an acknowledgement of the receipt of the SMS message sent in step 807, then that acknowledgement may take the form of an SMS message from the PDA 101 to the server 107 or may simply take the form of a synchronization request corresponding to the data filters specified in the notification message. Either way, if the acknowledgement message is not received by the process 800 on the server 107, control returns to step 809 where the notification message is resent. If an acknowledgement message is received in step 811 or not required in step 809, then control proceeds to a Clear Weight step 813 where the cumulative weight, if there is one, is reset. Control then proceeds to the End step 817 where processing is complete with respect to the transaction initiated in step 801.

Figure 9:
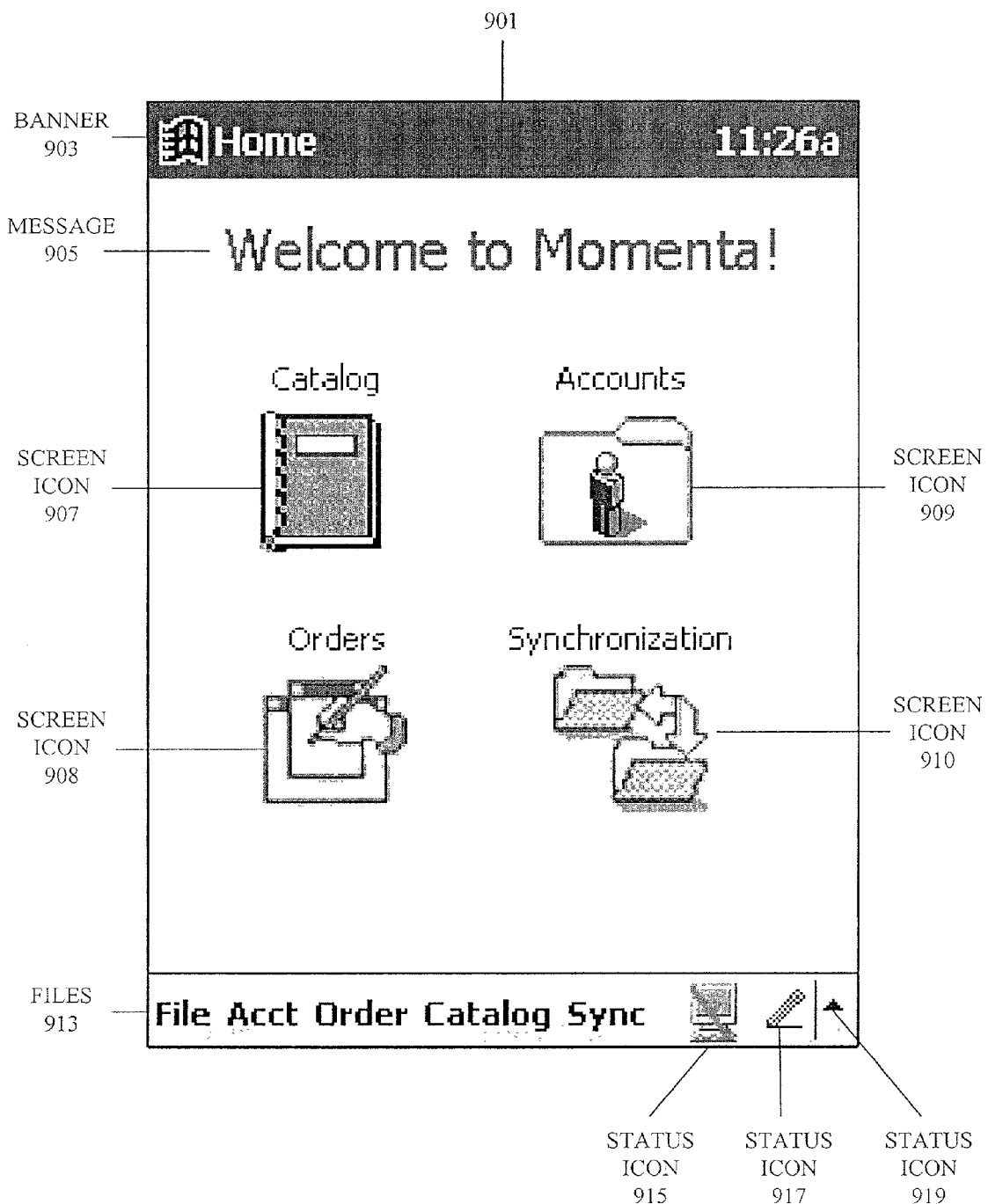
FIG. 9 illustrates an exemplary Home screen display on the PDA of FIGS. 1 and 2.

FIG. 9 illustrates an exemplary Home screen display 901 as it would appear on the display 203 (FIG. 2) of the PDA 101 (FIGS. 1 and 2). The screen display 901 is shown as the first screen, once a user executes an application implementing the techniques of the claimed subject matter. As explained above in conjunction with FIG. 3, a few possible applications include the mobile e-commerce application 310, the mobile hospital application 320, the mobile logistics application 330 and the mobile finance application 340. For the purposes of the description of FIGS. 9–12, the mobile e-commerce application 310 is used as an example.

Across the top of the screen display 901 is a banner 903, which includes a title, "Home," and the current time, "11:26a." Below the banner 903 is a message 905, "Welcome to Momenta!," which can be changed depending upon the circumstances. Below the message 905, several screen icons, a Catalog icon 907, an Orders icon 908, an Accounts icon 909 and a Synchronization icon 910, are displayed. Each screen icon 907–910 represents a particular function of the e-commerce application 310. By touching one of the icons 907–910 with the stylus 207 (FIG. 2), the user executes a corresponding function of the mobile e-commerce application 310. Specifically, the Catalog icon 907 executes software on the PDA 101 that enables the user to review, and possibly modify, entries in a Products file; the Orders icon 908 executes software that enables the user to place, and possibly modify, customer orders; the Accounts icon 909 executes software that enables the user to review, and possibly modify, the accounts of the user's customers; and the Synchronization icon 910 executes software that enables the user to define, redefine and change options on the user's synchronization filters. The examples that follow in conjunction with FIGS. 9–12 are related to the Catalog icon 907 and the Products file, or database, that corresponds to a product catalog of the mobile e-commerce application 310.

Below the screen icons 907–910 is a files footer 913, which includes options "Acct," "Order," "Catalog" and "Sync," corresponding to the screen icons 909, 908, 907 and 910 respectively. By touching one of these options with the stylus 207, the user can execute, through a series of menus (not shown), the same software executed by the corresponding screen icon 907–910. In addition to the options corresponding to the screen icons 907–910, the files footer 913 includes a "File" option. The File option is similar to the file option in many common programs such as Microsoft Word in that it displays a menu that enables the user to perform such actions as opening, closing and saving various files that represent the user's work. Also included in the files footer 913 are several status icons, including a computer icon 915, which indicates whether or not the PDA 101 is in communication with a remote server 107 (FIG. 1), a stylus icon 917, which indicates whether or not the PDA 101 is enabled to use the stylus 207, and a page up icon 919, which enables the user to scroll the screen display 901 by touching the arrow with the stylus 207. The page up icon 919 is used when the screen display 901 does not fit within the display 203. Of course, the page up icon 919 can change to a down symbol, instead of an up symbol as in this screen display 901, or both an up and a down symbol, depending upon the size of the screen display 901 and its relative position in the display 203.

Figure 10:
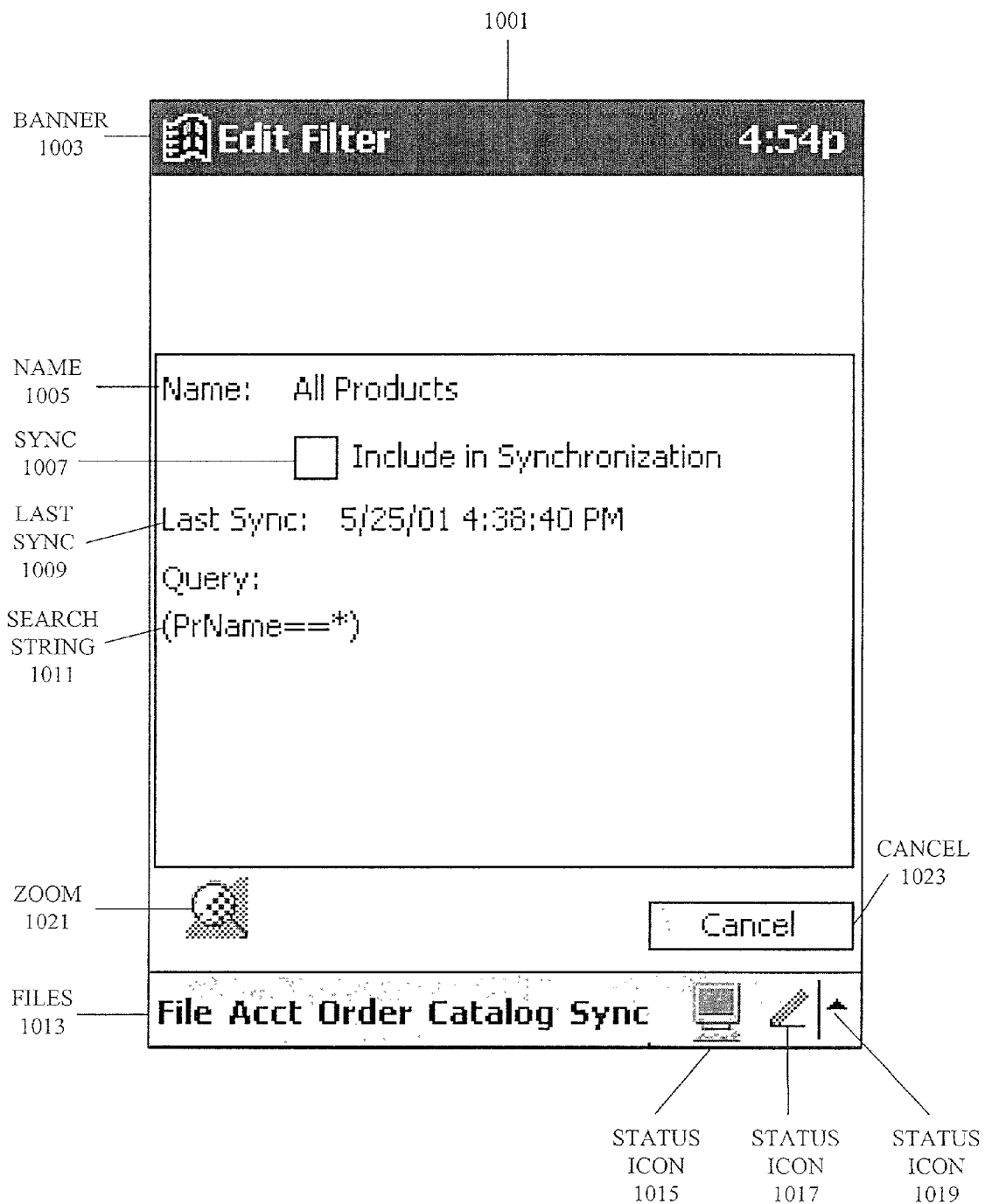
FIG. 10 illustrates an exemplary Edit Filter screen display on the PDA of FIGS. 1 and 2.

FIG. 10 is an exemplary Edit Filter screen display 1001 of the mobile e-commerce application 310 (FIG. 3) as it would appear on the display 203 (FIG. 2) of the PDA 101 (FIGS. 1 and 2). The screen display 1001 appears on the display 203 after a user either selects the Synchronization icon 910 (FIG. 9) by touching the appropriate icon with the stylus 207 or activates the corresponding action by means of a menu displayed by the Sync option of the files footer 913. Like the screen display 901 (FIG. 9), the screen display 1001 includes a banner 1003, which includes a tide, "Edit Filter," and a current time, "4:54p." The screen display 1001 also includes a files footer 1013 and status icons 1015, 1017 and 1019, each of which serve a similar function as the files footer 913 and the status icons 915, 917 and 919 (FIG. 9) respectively.

The screen display 1001 includes a Zoom icon 1021, which enables the user to change the size of the screen display 1001, either making it smaller so that more of it fits into the display 203 or making it larger so that it is easier to see. A Cancel icon 1023 enables a user to abort the currently running program and return to a previous screen display such as the Home display 901. Of course, the Zoom icon 1021 and the Cancel icon 1023, as well as the other icons, arrows, buttons, choice boxes and menus described in conjunction with FIGS. 9–12 are selected or activated by means of touching the stylus 207 to the appropriate symbol in the display 203 of the PDA 101. Although the particular type of user interface is not critical to the spirit of the invention, the stylus 207 and display screen 203 are employed throughout the following description of the figures.

The screen display 1001 also includes fields to enable the user to specify a data filter to modify or create. When a data filter name is entered in a Name field 1005, such as "All Products" in this example, the mobile e-commerce application 310 either retrieves information on a data filter entitled "All Products," if the data filter already exists, or provides the screen display 1001 to enable the creation of a new data filter, if the All Products data filter does not already exist. A Sync field 1007 enables the user to specify whether or not the corresponding data filter is to be included in synchronization procedures of the PDA 101. In this example, the All Products data filter has not yet been included in synchronization as evidenced by the fact that the Sync field 1007 does not have a check. A data filter may not be included in a synchronization because the database that the data filter corresponds to does not change often enough to justify the communication overhead of frequent synchronization. Another data filter, such as an Orders data filter (not shown), may need to be used for synchronization because of a pressing need to keep a user, or sales person, informed of changes in a company's inventory.

A Last Sync field 1009 displays a date, "May 25, 2001," and a time, "4:38:40 PM," corresponding to a time and date when the All Products data filter was last used in a synchronization. A Query field 1011 shows an actual corresponding data filter, written using a syntax that should be easily recognizable to those with skill in the art. In this example, the data filter specifies that the All Products data filter retrieve all records in the Products database, i.e., a term "PrName" specifies a particular attribute in the Products database and an operator "=" specifies that records equalling the final term, or '*', should be retrieved and displayed. Since the term '*' is a wildcard character that matches any value, his particular data filter retrieves and displays all records in the Products database.

A properly formed data filter, or search string, can be described using Backus Naur Form ("BNF") notation as follows:

| (1) | filter = | "(" filtercomp ")" |
|---|---|---|
| (2) | filtercomp = | and | or | simpleFilter |
| (3) | and = | "&" filterlist |
| (4) | or = | "|" filterlist |
| (5) | filterlist = | 1 *filter |
| (6) | simpleFilter = | attributeName filtertype value |
| (7) | filtertype = | "==" | ">=" | "<=" | "!=" |

An attributeNane is alphanumeric and corresponds to a column in the Products database or file. Binary attributes are not used within a data filter, i.e., a data filter cannot compare two JPEG images for equality. A value corresponds to any permissible entry for an attribute, e.g., the price of a baseball can be almost any numeric value such as $5.00; the value of a product name is typically a noun such as "baseball."

Figure 11:
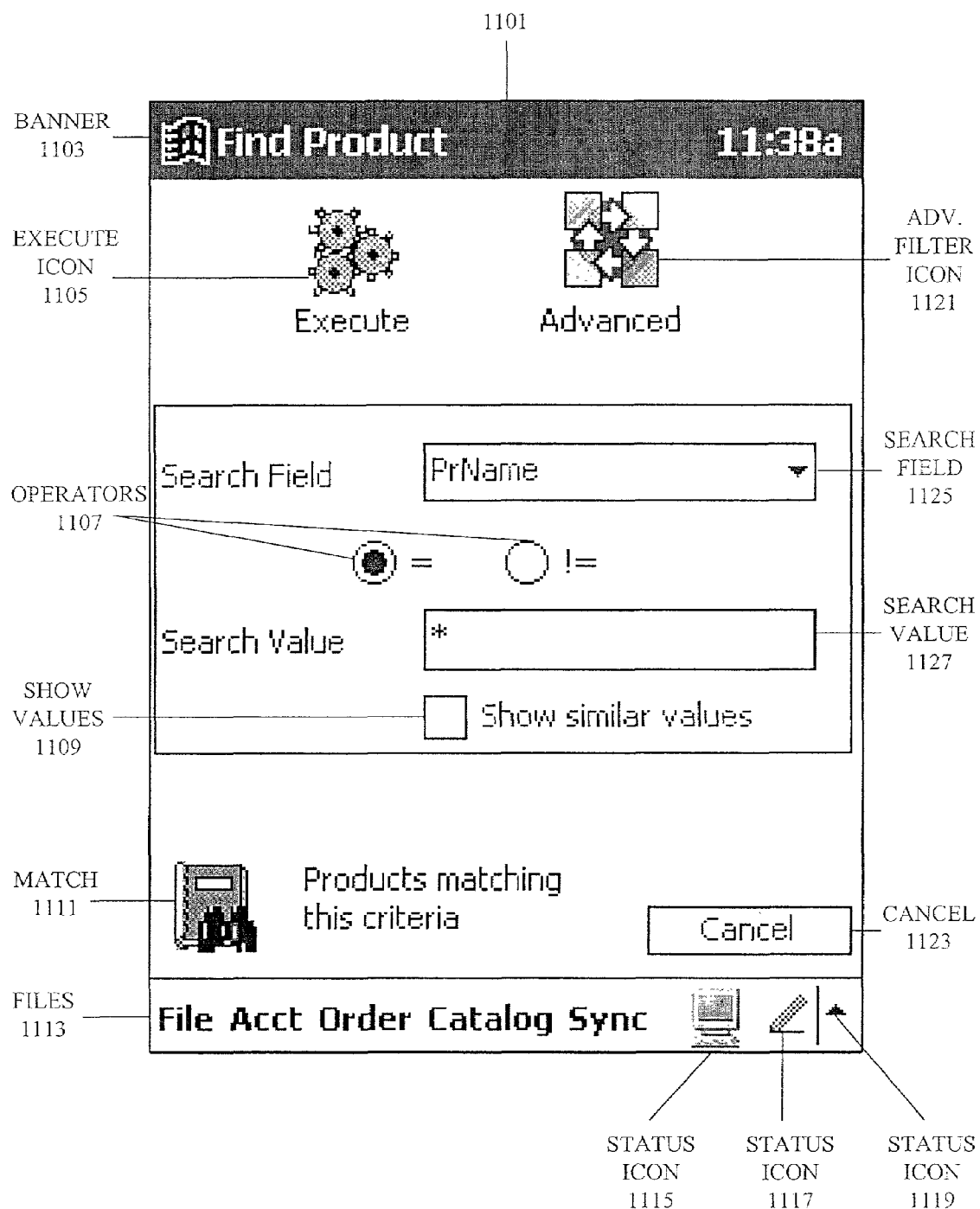
FIG. 11 illustrates an exemplary Find Product screen display on the PDA of FIGS. 1 and 2.

FIG. 11 illustrates a first exemplary Find Product screen display 1101 of the mobile e-commerce application 310 as it would appear on the display 203 (FIG. 2) of the PDA 101 (FIGS. 1 and 2). The screen display 1101 is an entry screen that enables the user, or sales person, to define or modify a data filter using the display 203 and the stylus 207 (FIG. 2). Like the screen display 901 (FIG. 9) and the screen display 1001 (FIG. 10), the screen display 1101 includes a banner 1103, which includes the name of the screen display 1101, "Find Product," and the current time, "11:38a"; a files footer 1113; and status icons 1115, 1117 and 1119, all of which exhibit similar functionality to the corresponding banner, files footer and status icons in FIGS. 9 and 10. Under the banner 1103, the screen display 1101 includes two icons, an Execute icon 1105 and an Advanced Filter icon 1121. When the user touches the Execute icon 1105 with the stylus 207 (FIG. 2), a current data filter, corresponding to the information displayed in the screen display 1101, is executed. In this example, the current data filter is the same as the data filter described above in conjunction with FIG. 10, or "PrName=='*'. When the user touches the Advanced icon 1121 with the stylus 207, the current screen display 1101 is replaced with another Find Product screen display 1201, described below in conjunction with FIG. 12. The screen display 1201 enables the user to create or modify more complicated, or advanced, data filters.

The screen display 1101 includes a Search field 1125, in which the user enters a particular attribute name from in this example, the Products file. When an inverted triangle at the right edge of the Search field 1125 is touched with the stylus 207, a drop-down pick list is displayed, enabling the user to select an attribute from the Products file, or database table, if desired. A Search Value field 1127 enables the user to enter a value that he wants to use in the data filter being defined or created. In this example, the value is equal to "*", which is a wildcard character that matches any value in the file. Thus, all the records in the Products file would be returned. Another example of a value that may be entered in the Search Value field 1127 is "baseball," which would cause the data filter to return any entry in the Products file in which the product name is equal to the word "baseball." If the user entered the term "base*", then the data filter would return all the records in the Products file corresponding to "baseballs" or "baseball bats." Two operator entry fields 1107 enable the user to specify a desired relation between the Search field 1125 and the Search Value field 1127. In this example, the two operator field 1107 choices, only one of which can be selected, are '=' and '!='. The '=' operator field 1107 indicates that the user wants the data filter to return all entries in the Products file in which the attribute entered in the Search field 1125 equals the value entered in the Search Value field 1127. If the user selects the "!=" operator field 1107, then the user wants the data filter to display all entries in the Products file in which the attribute specified in the Search field 1125 does not match the value entered in the Search Value field 1127.

A Show Values check box 1109 enables the user to specify a "fuzzy" search. In other words, instead of searching for entries in which the attribute named in the Search field 1125 exactly matches the value entered in the Search Value field 1127, the data filter returns all entries in the Products file in which the match is close. A match icon 1111 provides similar functionality to the Show Values check box 1109, but enables the user to execute the data filter and see the results immediately. A Cancel button 1123 aborts the current data filter definition or creation process and returns the display 203 to a previously displayed display screen.

Figure 12:
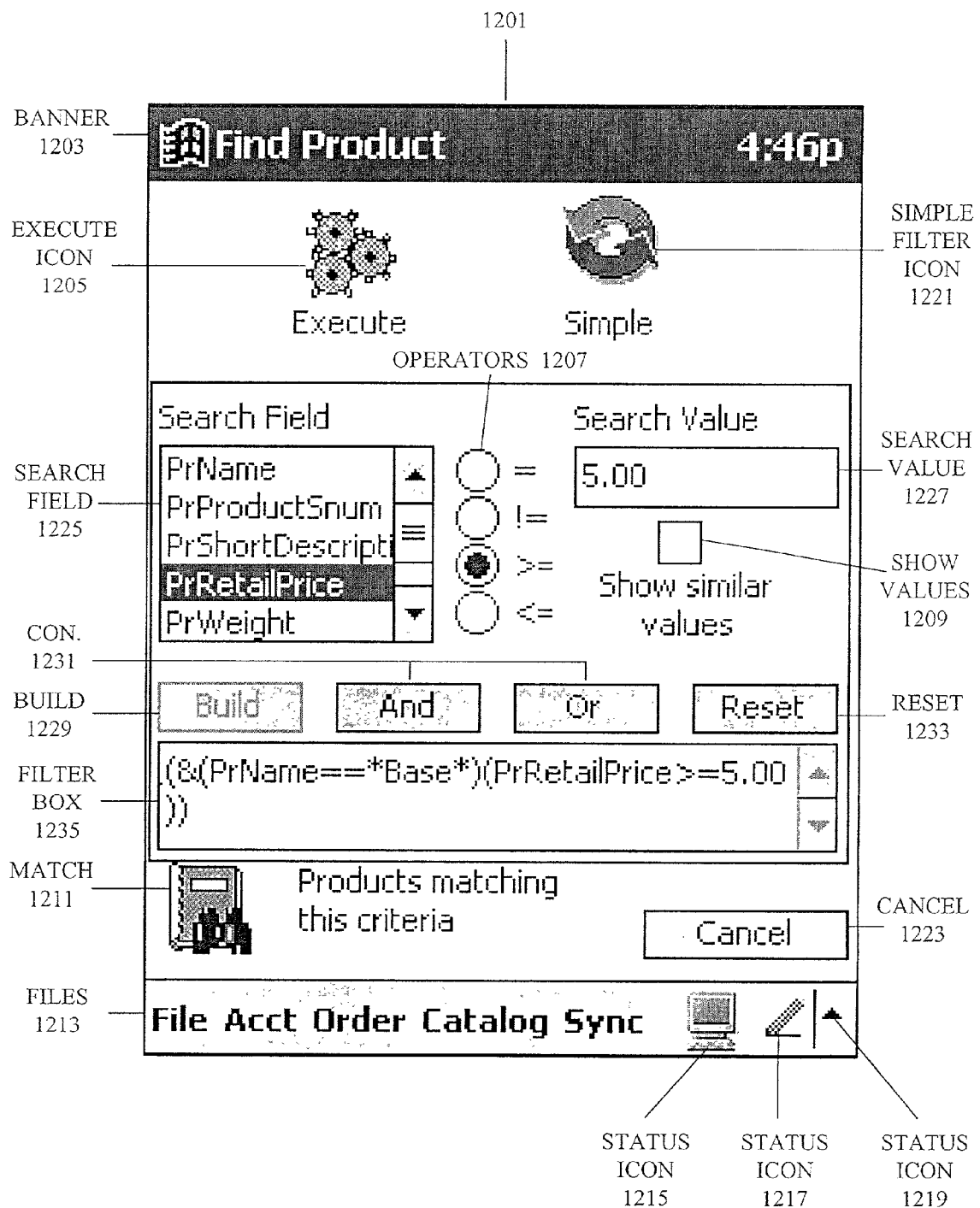
FIG. 12 illustrates a second exemplary Find Product screen display on the PDA of FIGS. 1 and 2.

FIG. 12 illustrates a second exemplary Find Product screen display 1201 as it would appear on the display 203 (FIG. 2) of the PDA 101 (FIGS. 1 and 2). Like the screen display 1101 (FIG. 11), the screen display 1201 is an entry screen that enables the user, or sales person, to define or modify a data filter using the display 203 and the stylus 207 (FIG. 2). However, unlike the screen display 1101, which enables the user to enter create or modify a simple data filter, the screen display 1201 enables the user to create or modify more advanced, or complex, data filters. Like the screen displays 901 (FIG. 9), 1001 (FIG. 10), and 1101, the screen display 1201 includes a banner 1203, which includes the name of the screen display 1201, "Find Product," and the current time, "4:46p"; a files footer 1213; and status icons 1215, 1217 and 1219, all of which exhibit similar functionality to the corresponding banner, files footer and status icons in FIGS. 9, 10 and 11. Like the screen display 1101, the screen display 1201 includes a match icon 1211 and a Cancel button 1223, which function in similar fashion to the match icon 1111 and the Cancel button 1123 (FIG. 11), respectively.

Under the banner 1203, the screen display 1201 includes two icons, an Execute icon 1205 and a Simple icon 1221. When the user touches the Execute icon 1205 with the stylus 207 (FIG. 2), a current data filter, corresponding to the information displayed in a display box 1235, or in this example "(&(PrName==*Base*)(PrRetailPrice>=5.00))", is executed. Simply, the current data filter returns entries in the Products database in which the word "base" is somewhere in the name of the product and the price is greater than or equal to $5.00. For example, entries for baseballs, baseball mitts, baseball bats and baseball gloves that cost $5.00 or more are all returned for display on the PDA 101. The meaning and syntax of such data filters is well known to those with skill in the art. At the right edge of the display box 1235 is an up arrow and a down arrow, which when touched by the stylus 207, cause the display box 1235 to scroll if the current data filter is too large to fit within the confines of the display box 1235. If the user touches the stylus 207 to the Simple icon 1221, the PDA 101 displays the screen display 1101 on the display 203 of the PDA 101.

Like the Find Product screen display 1101, the screen display 1201 enables the user to enter a data filter, albeit a more complex one than the data filters of the screen display 1101. A Search field 1225 enables the user to select multiple attributes of the Products database, one attribute at a time. A Search Value field 1227 enables the user to enter a price or other appropriate value to employ in a search of the database. Instead of the two operator entry fields provided in the screen display 1101, the screen display 1201 includes four operator entry fields 1207, a '=' operator, or "equal to," a '!=' operator, or "not equal to," a ">=" operator, or "greater than or equal to," and a "<=" operator, or "less than or equal to." A Show Values check box 1209 functions in similar fashion to the Show Values check box 1109 of the screen display 1101.

The screen display 1201 also includes a Build button 1229, two conjunction buttons 1231 and a Reset button 1233. The Build button 1229 moves a new search string specified by the Search field 1225, the operator entry fields 1207 and the Search Value field 1227 into the expression displayed in the display box 1235. The conjunction buttons 1231 determine the relationship in a compound search string between the new search string moved by the Build button 1229 and an existing search string, if there is one, already displayed in the display box 1235. An "And" conjunction button 1231 creates a compound search string in which the conditions of both the new search string and the existing search string must be satisfied for an entry in the Products database to be displayed. An "Or" conjunction button 1231 creates a compound search string in which one or both of the conditions represented by the new search string and the existing search string must be satisfied for an entry in the Products database to be displayed. The Reset button 1233, when touched by the stylus 207, clears the display box 1235, thus enabling the user to start over in the creation of a search string.

Using the screens of FIGS. 9–12, the user can define data filters employed to practice the techniques of the disclosed embodiment. FIGS. 9–12 represent only a select portion of a graphical user interface (GUI), displayed on the display 203 of the PDA 101, that enables the execution of the mobile e-commerce application 310. The other applications 320, 330 and 340 have their own particular functionalities, GUIs and corresponding screens. While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

We claim:

1. A method of database synchronization between a first database on a server and
  a second corresponding database on a wireless computing device, comprising the steps of:
  generating on a wireless computing device a synchronization request message, wherein the synchronization request message includes a data object, and an action executed on the data object;
  transmitting the synchronization request message from the wireless computing device to a server;
  validating the data object and the action on the server based upon the synchronization request message and business logic, defined by a user of the wireless computing device, corresponding to a domain of the data object;
  updating remote data the on the server based upon the business logic;
  generating a synchronization response message on the server based on results corresponding to the validating and the updating steps, wherein the synchronization response message includes a value corresponding to the results;
  transmitting the synchronization response message from the server to the wireless computing device; and
  updating a data storage on the wireless computing device based upon the synchronization response message.

2. The method of claim 1, wherein the wireless computing device is a personal digital assistant (PDA).

3. The method of claim 1, further comprising the steps of:
  prior to the transmitting step, determining whether or not the wireless computing device is in an on-line mode or an off-line mode; and if the wireless computing device is in an on-line mode, proceeding to the transmitting of the synchronization request message step; or
  if the wireless computing device is in an off-line mode, placing the synchronization request message into a synchronization queue; and
  proceeding to the transmitting of the synchronization request message step once the wireless computing device is in the on-line mode.

4. The method of claim 1, wherein the synchronization request message includes an old data object corresponding to the data object prior to the execution of the action, and the validating step comprises the step of:
  comparing the old data object to a second data object, in the remote data storage, corresponding to the data object.

5. The method of claim 4, wherein the synchronization response message includes the copy of the data object if the old data object does not match the copy of the data object.

6. The method of claim 1, wherein the synchronization request message includes a first timestamp corresponding to a time the action was executed on the data object, and the validating step comprises the step of:
  comparing the first timestamp with a second timestamp on a second object, stored in the remote data storage, corresponding to the data object.

7. A method of verifying an action taken on a data object stored on a local data storage of a wireless computing device, comprising the steps of:
  generating a synchronization request message on a wireless computing device, wherein the synchronization request message includes a copy of a data object on a local data storage, an action that has been taken on the data object, and an old data object corresponding to the data object prior to when the action was taken;

transmitting the synchronization request message from the wireless computing device to a server;

processing the copy of the data object on a remote data storage on the server based upon business logic corresponding to a domain of the data object and defined by a user of the wireless computing device;

generating on the server a synchronization response message based upon a result of the processing step, wherein the synchronization response message includes a value corresponding to the result; and transmitting the synchronization response message to the wireless computing device.

8. The method of claim 7, further comprising the steps of:

resetting the data object to the value of the old data object if the synchronization response message indites that the processing step was not successful; or setting a status corresponding to the data object to a value of "updated" if the synchronization response message indicates the processing step was successful.

9. The method of claim 7, wherein the processing step comprises the steps of:

validating the copy of the data object; and if the validating is successful, updating a second data object, in the data storage of the server, corresponding to the data object.

10. The method of claim 9, wherein the validating step comprises the step of:

comparing the old data object to the second data object.

11. The method of claim 9, wherein the synchronization request message includes a first timestamp corresponding to the data object, and the validating step comprises the step of:

comparing the first timestamp with a second timestamp corresponding to the second data object.

12. The method of claim 7, wherein the wireless computing device is a personal digital assistant (PDA).

13. The method of claim 7, wherein the wireless computing device is a computer.

14. A distributed data storage system, comprising:

a wireless computing device, comprising:

a local data storage;

logic for generating a synchronization request message, comprising:

a copy of a data object corresponding to a data object stored in the local data storage;

an action corresponding to an operation performed on the data object; and an old data object corresponding to the data object prior to when the operation was performed on the data object; and a server, comprising:

a remote data storage;

business logic for processing the synchronization request message, generating on the server a synchronization response message based upon a result of the processing step, and transmitting the synchronization response message to the wireless computing device, wherein the business logic is defined by a user of the wireless computing device and corresponds to a domain of the data object and the synchronization response message includes a value corresponding to the result.

15. The distributed data storage system of claim 14, wherein the business logic comprises:

validating logic for determining whether or not the action can be executed on a second data object in the remote data storage and corresponding to the data object;

logic for executing the action on the second data object when the validation logic determines that the action can be executed on the second data object; and conflict resolution logic that executes when the validation logic determines that the action cannot be executed on the second data object.

16. The distributed data storage system of claim 15, wherein the validation logic comprises:

logic for comparing the old data object to the second data object.

17. The distributed data storage system of claim 15, wherein the synchronization request message includes a first timestamp corresponding to the data object and the validation logic comprises:

logic for comparing the first timestamp with a second timestamp corresponding to the second data object.

18. The distributed data storage system of claim 14, wherein the wireless computing device is a personal digital assistant (PDA).

19. The distributed data storage system of claim 14, wherein the wireless computing device is a computer.

* * * * *